United States Patent
Kauffmann

(10) Patent No.: US 10,538,172 B2
(45) Date of Patent: Jan. 21, 2020

(54) APPARATUS THAT AUTOMATES THE CONNECTING PROCESS BETWEEN A PRIMARY CONNECTOR AND A SECONDARY CONNECTOR FOR CHARGING AN ELECTRIC VEHICLE

(71) Applicant: Alan Kauffmann, Bothell, WA (US)

(72) Inventor: Alan Kauffmann, Bothell, WA (US)

( * ) Notice: Subject to any disclaimer, the term of this patent is extended or adjusted under 35 U.S.C. 154(b) by 14 days.

(21) Appl. No.: 16/028,834

(22) Filed: Jul. 6, 2018

(65) Prior Publication Data

US 2019/0009680 A1    Jan. 10, 2019

Related U.S. Application Data

(60) Provisional application No. 62/529,129, filed on Jul. 6, 2017.

(51) Int. Cl.
*B60L 53/16*    (2019.01)
*H01R 13/631*   (2006.01)
(Continued)

(52) U.S. Cl.
CPC .......... *B60L 53/16* (2019.02); *H01R 13/5202* (2013.01); *H01R 13/5213* (2013.01);
(Continued)

(58) Field of Classification Search
CPC .......... B60L 53/16; B60L 53/38; B60L 53/12; H01R 13/5213; H01R 13/73;
(Continued)

(56) References Cited

U.S. PATENT DOCUMENTS 2,811,574 A    6/1953  Guerrero
3,433,886 A    3/1969  Myers
(Continued)

FOREIGN PATENT DOCUMENTS

JP    2005255144 A    9/2005
JP       5606098 B2   10/2017
WO    2012058183       5/2012

OTHER PUBLICATIONS

Robert McArthur, International Builders Show, Robert B. McArthur Studios, Jan. 24, 2011. website: http://robertgmcarthurstudios.com/2011/01/24/international-builders-show-2/.
(Continued)

*Primary Examiner* — M Baye Diao
(74) *Attorney, Agent, or Firm* — Emerson, Thomson & Bennett, LLC; Roger D. Emerson

(57) ABSTRACT

Provided is an automated electrical connection apparatus for an electric vehicle. The automated electrical connection apparatus employs a primary connector connection apparatus at a charge site and a secondary connector connection apparatus on a vehicle. In its non-use state, the primary connector at the charge site is flush with the surface of the ground. When the charging system is activated, the primary connector will extend up from the surface of the ground to engage the secondary connector on the vehicle. The automated electrical connection apparatus provides a means to align the corresponding electrical connection within primary and secondary apparatus to establish a connection between the primary connector at the charge site and the secondary connector on the vehicle. Once the charging cycle is terminated, the component parts of the charging system will retract back to the flush position.

19 Claims, 31 Drawing Sheets

(51) Int. Cl.
 H01R 13/52 (2006.01)
 H01R 13/73 (2006.01)
 H01R 13/62 (2006.01)
(52) U.S. Cl.
 CPC ............ H01R 13/631 (2013.01); H01R 13/73 (2013.01); *H01R 13/6205* (2013.01); *H01R 2201/26* (2013.01)
(58) Field of Classification Search
 CPC .............. H01R 13/5202; H01R 13/631; H01R 2201/26; H01R 13/6205
 USPC ....................................................... 320/108
 See application file for complete search history.

(56) References Cited

U.S. PATENT DOCUMENTS

| | | | |
|---|---|---|---|
| 3,594,693 | A | 7/1971 | Robbins |
| 3,646,244 | A | 2/1972 | Cole |
| 3,794,956 | A | 2/1974 | Dubreuil |
| 4,041,986 | A | 8/1977 | Resch et al. |
| 4,984,982 | A | 1/1991 | Brownlie et al. |
| 5,023,396 | A | 6/1991 | Bartee et al. |
| 5,122,069 | A | 6/1992 | Brownlie et al. |
| 5,342,993 | A | 8/1994 | Siems |
| 5,565,755 | A | 10/1996 | Keith |
| 5,654,621 | A | 8/1997 | Seelig |
| 5,705,772 | A | 1/1998 | Brown |
| D392,254 | S | 3/1998 | Gevaert |
| D405,051 | S | 2/1999 | Byrne |
| D405,052 | S | 2/1999 | Byrne |
| D406,102 | S | 2/1999 | Byrne |
| D406,103 | S | 2/1999 | Byrne |
| D407,374 | S | 3/1999 | Byrne |
| D412,695 | S | 8/1999 | Byrne |
| D412,696 | S | 8/1999 | Byrne |
| D412,697 | S | 8/1999 | Byrne |
| D412,698 | S | 8/1999 | Byrne |
| D420,327 | S | 2/2000 | Byrne |
| 6,028,267 | A | 2/2000 | Byrne |
| 6,046,405 | A | 4/2000 | Obermann |
| 6,129,025 | A * | 10/2000 | Minakami ................ B60L 5/005 104/88.01 |
| 6,234,812 | B1 | 5/2001 | Ivers et al. |
| 6,290,518 | B1 | 9/2001 | Byrne |
| 6,329,595 | B1 | 12/2001 | Roberts |
| D463,775 | S | 10/2002 | Byrne |
| D472,213 | S | 3/2003 | Byrne |
| 7,105,745 | B2 | 9/2006 | Drane |
| 7,276,662 | B2 | 10/2007 | Drane |
| 7,301,100 | B2 | 11/2007 | Drane |
| 7,635,110 | B2 | 12/2009 | Galasso et al. |
| 8,007,295 | B2 | 8/2011 | Lin |
| 8,242,365 | B2 | 8/2012 | Galasso et al. |
| 8,348,683 | B2 | 1/2013 | Row |
| 8,937,454 | B2 | 1/2015 | Baarman et al. |
| 9,527,403 | B2 | 12/2016 | Mardall et al. |
| 9,543,769 | B2 | 1/2017 | Kauffmann |
| 2010/0277121 | A1 | 11/2010 | Hall et al. |
| 2011/0246014 | A1 | 10/2011 | Sauper |
| 2012/0108085 | A1 | 5/2012 | Row |
| 2012/0119698 | A1 | 5/2012 | Karalis et al. |
| 2013/0320923 | A1 | 12/2013 | Hooker et al. |
| 2014/0091757 | A1 | 4/2014 | Proebstle et al. |
| 2015/0015419 | A1 | 1/2015 | Halker et al. |
| 2015/0306974 | A1 | 10/2015 | Mardall et al. |
| 2017/0096073 | A1 | 4/2017 | Mardall et al. |

OTHER PUBLICATIONS

Daphne Lasky, Infrastructural Ground, some emergent markets, Jul. 12, 2010. website: http://somemarkets.wordpress.com/tag/emergence/.
Schulte Elektrotechnik, Ludenscheid, Germany, Jun. 10, 2017. website: https://web.archive.org/web/20170610151015/https://evoline-usa.com/.
Joho, China, Jun. 1, 2011 website: http://sell.lulusoso.com/selling-leads/73790/POP-UP-Electrical-Floor-receptacle-with-British-type-socket.html.
website: http://www.taroto.jp/site/pdf/012/132.pdf.
Guangzhou Jun South Audio-Visual Technology Co., Ltd., Guangzhou, China, Jun. 25, 2017. website: https://web.archive.org/web/20170625052939/http://www.gzgoge.com/product.asp.
Wenzhou Omee Electrical Technology Co., Ltd., Zhejiang, China, Jun. 4, 2017. website: https://web.archive.org/web/20170604041012/http://www.omeenet.com/.
Cixi Mingye Communicating & Electronic Co., Ltd., Cixi, Zhejiang, China, Nov. 10, 2016. website: https://web.archive.org/web/20161110083335/http://www.mingye.com.
Yueqing Iger Electric Co., Ltd., Yueqing, Zhejiang, China, Jun. 24, 2017. website: https://web.archive.org/web/20170624114846/http://www.igercn.com/.
Guangzhou Meixin (R&F Chuanga) Video Electronic Equipment Co., Ltd., Guangzhou, China, Jun. 25, 2017. website: https://web.archive.org/web/20170625233750/http://www.chuangd.com/.
Doug Mockett & Company, Inc., Aug. 13, 2014. website: https://web.archive.org/web/20140813083839/http://www.mockett.com/pdf/Reprint_Technology.pdf.
Thomas & Betts Corporation, Apr. 3, 2016. website: https://web.archive.org/web/20160403081727/http://www-public.tnb.com/pub/node/319.
cableorganizer.com., Apr. 27, 2016. website: https://web.archive.org/web/20170731193641/https://www.cableorganizer.com/pop-n-plug/pop-n-plug-power-data-center.htm.
Divya Electricals, Jun. 23, 2017. website: https://web.archive.org/web/20170623085156/http://www.divyaele.com/.
Altima, Jun. 20, 2017. website: https://web.archive.org/web/20170901000000*/http://www.altimahitech.com/.
International Search Report and Written Opinion for corresponding International Patent Application No. PCT/US2018/041023 dated Oct. 29, 2018.

\* cited by examiner

APPARATUS THAT AUTOMATES THE CONNECTING PROCESS BETWEEN A PRIMARY CONNECTOR AND A SECONDARY CONNECTOR FOR CHARGING AN ELECTRIC VEHICLE

TECHNICAL FIELD

Provided is an automated plug in system for electric vehicles. The automated plug in system includes a pop-up apparatus which allows for precise alignment and plugging in of a primary connector or power source at a charging site with a secondary connector on an electric vehicle. The connection between the primary connector and the secondary connector is be established without the driver having to physically connect the primary connector to the secondary connector to charge an electric vehicle.

BACKGROUND

As the world moves away from the internal combustion engine and towards electric vehicles for its transportation needs, the demand for more electric vehicle charging sites is increasing. Also, technology is demanding a better way to connect a vehicle with a power source located at vehicle charging sites. The present method of driving up to a charging station and having the driver get out of the vehicle to pick up a connector that is connected to a cable (i.e., a primary connector or power source), in a manner that is similar to picking up a gas nozzle at a gas station, and engaging the primary connector with a corresponding secondary connector located on a vehicle to charge the vehicle's battery is inefficient and unappealing.

There are a number of logistical issues that must be addressed when designing electric vehicle service equipment (EVSEs). For example, there is no one standard connector for all electric vehicles. Second, the container that houses the connecting apparatus needs to be sufficiently strong and protected. The connecting apparatus will also be exposed to severe environmental conditions such as dust and dirt, rain and snow and extreme hot and cold conditions. Therefore, durability in various types of environmental conditions must also be considered. The connecting apparatus will also have a tendency to accumulate dirt and grime around the primary and secondary connectors over a period of time. Therefore, there must also be a way to protect the connecting apparatus from the environment. In addition, the environmental impact of a charging site's location must also be considered with the goal being to provide as little obstruction as possible to traffic patterns.

Finally, with the eye of the transportation industry set on automation, the EVSE must be of a kind that may be self-automated and capable of being integrated with current systems within the electric vehicle industry. An automated process which allows drivers or an autonomous vehicle to drive up to a charging site and automatically initiate charging of the vehicle without ever having to leave the vehicle will provide a safer environment for charging vehicles as it will keep drivers away from high voltages. It will also eliminate the hassle of drivers having to exit their vehicles to initiate a charging session, leading to a more efficient charging process. These issues among others are addressed in the present disclosure.

SUMMARY

Provided is an automated electrical connection apparatus for charging a battery on an electric vehicle. The automated electrical connection apparatus includes a primary connector at a charging site. The primary connector includes a pop-up apparatus positioned under a ground surface that is capable of being adjusted between an in use or extended position out of the ground surface and a non-use, retracted or stowed position beneath the ground surface, wherein the pop-up apparatus includes a container positioned under the ground surface, wherein the container includes a bottom end, an open top and at least one side wall comprising an inside wall and an outside wall, wherein the pop-up apparatus further includes a primary adjustment mechanism having a top end and a bottom end positioned within the container and a primary connector cover housing an electrical connection device connected to the top end of the primary adjustment mechanism, wherein the primary connector cover is flush with the ground surface when the primary adjustment mechanism is in the retracted or stowed position, wherein the open top of the container includes a crown which provides a surface for the primary connector cover to rest on and a seal bed to prevent water and contaminants from entering the container. The automated electrical connection apparatus also includes a secondary connector on an electric vehicle. The secondary connector includes a secondary connector cover housing an electrical connection device and optionally, a secondary adjustment mechanism connected to the secondary connector cover which is positioned within the vehicle and is capable of being adjusted between an in use or extended position out from the vehicle and a non-use, retracted or stowed position within the vehicle, wherein an electrical connection is established between the primary connector cover and the secondary connector cover when the pop-up apparatus is adjusted to its extended position. The electrical connection apparatus also includes at least one of the following: 1) an electrical connection device on the primary connector cover which one or more primary induction coils connected to a power source and an electrical connection device on the secondary connector cover which includes one or more secondary induction coils, wherein the secondary induction coil is connected to a vehicle's circuitry to charge the battery on the vehicle, wherein an electrical connection between the primary connector cover and the secondary connector cover is established without the primary connector cover being in physical contact with the secondary connector cover; 2) an electrical connection device on the primary connector cover which includes primary plug in connector connected to a power source and an electrical connection device on the secondary cover which includes a secondary plug in connector, wherein the secondary plug in connector is connected to a vehicle's circuitry to charge the battery on the vehicle, wherein the primary plug in connector engages a secondary plug in connector when the pop-up apparatus of the primary connector is in the extended position; and 3) an electrical connection device on the primary connector cover which includes a primary side of an electrical transformer and an electrical connection device on the secondary connector cover which includes a secondary side of the electrical transformer, wherein the primary side of the electrical transformer is connected to a power source, wherein the secondary side of the electrical transformer is connected to a vehicle's circuitry to charge the battery on the vehicle, wherein the primary side of the transformer and the secondary side of the transformer form a single transformer unit when the primary connector cover is in its extended position and connected to the secondary connector cover.

According to certain aspects of the present disclosure, the pop-up apparatus further includes bellows positioned between the container crown and the primary connector cover, wherein the bellows includes at least one side wall, a top open and a bottom open end, wherein the bellows houses the primary adjustment mechanism and wherein the bellows maintains a watertight fit over the pop-up apparatus when the primary connector or pop-up apparatus is in the extended position.

According to further aspects of the present disclosure, the bottom end of the bellows includes a movable bellows flange that fits against the inside wall of the crown forming a moveable watertight seal and wherein the top end of the bellows includes an internal ring for attaching the bellows to the primary connector cover.

According to further aspects of the present disclosure, the primary connector cover rests within the crown of the container when the primary connector cover is in the retracted or stowed position, wherein a cover boot is attached to the primary connector cover, wherein the cover boot includes a first aperture allowing compressed air to enter within an interior space formed within the cover boot and a second aperture allowing compressed air to exit from the interior space formed within the cover boot, wherein upon activation of a charging event, a blast of compressed air enters between the primary connector cover and the cover boot causing the cover boot to elongate and expand to loosen any debris and ice formed on its surface, wherein as air exits from the cover boot, loosed debris and ice are blown off from the cover boot and an actuator causes the primary adjustment mechanism to push the primary connector cover out of the crown.

According to further aspects of the present disclosure, the primary connector cover comprises electromagnets and the secondary connector cover include electromagnets, wherein upon activation of a charging cycle, the electromagnets on the primary connector cover and the secondary connector cover are activated to attract the primary connector cover and the secondary connector cover towards each other, wherein the primary connector cover is pulled perpendicular to its extension by the primary adjustment mechanism allowing for alignment between the primary connector cover and the secondary connector cover.

According to further aspects of the present disclosure, the primary connector cover includes a nonconductive housing, clocking permanent magnets and male pins or female receptacles and/or a primary transformer side, wherein the secondary plug in connector comprises a nonconductive housing, clocking permanent magnets and male pins or female receptacles and/or a secondary transformer side.

According to further aspects of the present disclosure, the primary plug in connector includes male pins and the secondary plug in connector includes female receptacles for engagement with the male pins of the primary plug in connector, wherein at least one of the primary plug in connector nonconductive housing and the secondary plug in connector nonconductive housing includes a nonconductive disk housing the clocking permanent magnets and the male pins or female receptacles, wherein the clocking permanent magnets are mounted in such a manner that as the primary connector cover and the secondary connector cover approach each other, the clocking permanent magnets natural attractive and repulsive forces cause the nonconductive disk on at least one opposing connector cover to rotate to align the male pins with the female receptacles.

According to further aspects of the present disclosure, the primary connector cover includes a primary transformer side and the secondary connector cover includes a second transformer side, wherein at least one of the primary connector cover nonconductive housing and the secondary connector cover nonconductive housing comprises a nonconductive disk housing the clocking permanent magnets and the primary transformer side and the secondary transformer side, wherein the clocking permanent magnets are mounted in such a manner that as the primary connector cover and the secondary connector cover approach each other, the clocking permanent magnets natural attractive and repulsive forces cause the nonconductive disk on at least one opposing connector cover to rotate to align the primary transformer side with the secondary transformer side.

According to further aspects of the present disclosure, the primary transformer side slides in the primary connector cover rendering it flush with the surface of the primary connector cover when the primary connector is in a non-use, retracted or stowed position and wherein the primary transformer side slides out of the primary connector cover and into the secondary transformer side to form a single air gap transformer when the primary connector is in an in-use or extended position.

According to further aspects of the present disclosure, the primary adjustment mechanism of the primary connector comprises a scissor mechanism having a first end and a second end which allows the primary connector to be adjusted between the in-use or extended position out of the ground surface and the non-use retracted or stowed position within the ground surface, wherein a scissor support bracket is positioned near the open top of the container for supporting the scissor mechanism within the bellows and wherein the scissor mechanism comprises a first universal joint which connects the first end of the scissor mechanism to the bottom end of the container and a second universal which connects the second end of the scissor mechanism to the primary connector cover.

According to further aspects of the present disclosure, the primary adjustment mechanism comprises a power assisted push up mechanism that allows the primary connecter to be adjusted between the in-use or extended position out of the ground surface and the non-use retracted or stowed position within the ground surface.

According to further aspects of the present disclosure, the power assisted push up mechanism comprises a vertically oriented shaft having a top end and a bottom end, wherein the vertically oriented shaft is positioned within the container when in a non-use, retracted or stowed position within the ground surface and wherein the vertically oriented shaft extends the primary connector out of the container when in an in-use or extended position above the ground surface to reach the secondary connector cover installed on the vehicle.

According to further aspects of the present disclosure, a fastener connects the bottom end of the shaft to a linear actuator which operates to push the vertical oriented shaft out of the container when the primary connector is in an in use or extended position.

According to further aspects of the present disclosure an actuator or a hydraulic or pneumatic cylinder is attached to the bottom end of the container. According to further aspects of the disclosure, the actuator is a linear actuator.

According to further aspects of the present disclosure, the secondary connector comprises a container positioned within the vehicle, wherein the container includes an open bottom end and an open top end and at least one side wall, wherein the secondary connector does not include a secondary adjustment mechanism, and wherein the secondary connector cover housing the electrical connection device is mounted on a floating mounting device which is suspended between the top end and the bottom end of the container by closed cell foam.

According to further aspects of the present disclosure, the closed cell foam pushes and pulls the floating device from side to side inside the container in order to achieve alignment between the pins and receptacles of the primary and secondary connectors and wherein the closed cell foam forms a watertight seal for the container.

According to further aspects of the present disclosure, the bottom end of the container of the secondary connector has a cone shape which is larger in diameter than the primary connector cover allowing the primary connector cover to fit within the secondary connecter container and align itself with the electrical device on the secondary connector cover.

According to further aspects of the present disclosure, activation of the primary connector adjustment mechanism and optionally, the secondary connector adjustment mechanism is initiated wirelessly and automatically through an onboard computer on the vehicle, through a command entered on a software application on a mobile computer device, by the driver pushing a button on a control panel within the vehicle or through an independent charging site management system such as ChargePoint, Uber or a fleet service.

Also provided is a method of charging an electric vehicle utilizing the charging system. The method includes the following steps: driving a vehicle up to a charging station to renew a charge of a vehicle's battery; initiating contact between the secondary connector on the vehicle and the primary connector at the charging site, wherein contact is initiated wirelessly and automatically through an onboard computer on the vehicle, by a command on a software application on a mobile computing device or by the driver pushing a button on a control panel within the vehicle to send a wireless communication to a computing device within the primary connector or charging site to initiate the charging process, wherein upon receiving and accepting the communication from the vehicle or driver computing device, the primary connector begins the process of deployment, wherein the deployment process includes the following steps: blowing a blast of air is blown into a cavity between the cover and the cover boot, loosening ice and debris and allowing the air exiting through an aperture in the center of the cover boot to blow the ice and debris away, activating the adjustment mechanism of the primary connector to cause the primary connector cover to extend upward from the ground surface toward the secondary connector cover on the vehicle, initiating an actuator within the primary connector to cause the adjustment mechanism within the primary connector to push the primary connector cover out of the crown of the primary connector container, activating the electromagnets on the primary connector cover and the secondary connector cover to cause the primary connector cover to move towards the secondary connector cover, allowing permanent clocking magnets positioned on a nonconductive disk within a nonconductive housing on the primary connector and permanent clocking magnets positioned on a nonconductive housing on the secondary connector to cause the primary nonconductive disk and the secondary nonconductive disk to rotate with respect to each other in order to align the connection between the primary connector cover and the secondary connector cover. The process also includes the following steps: engaging the primary connector to the secondary connector to form an electrical connection, wherein electrical power is unavailable to the primary connector until the primary connector is engaged with the secondary connector; allowing electricity to flow through the electrical connection to charge the vehicle's battery; and terminating contact between the secondary connector and the primary connector, wherein contact is automatically terminated wirelessly through an onboard computer on the vehicle upon the battery achieving full charge, by a command entered on a software application on a mobile computing device or by the driver pushing a button on a control panel within the vehicle to send a wireless communication to a computing device within the primary connector or charging site terminate the charging process, wherein upon receiving and accepting the communication from the vehicle or driver computing device, the primary connector begins the process of retraction, wherein the retraction process includes the following steps: deactivating the electromagnets on the primary connector cover and the secondary connector cover to allow the primary connector cover and the secondary connector cover to disengage; discontinuing power to the primary connector prior to disconnection of the primary and secondary connectors; activating the adjustment mechanism on the primary connector to cause the primary connector cover to disengage from the secondary connector cover and retract downward towards the ground surface and away from the secondary connector cover on the vehicle until the primary connector is in a fully retracted position within the container and the primary connector cover is flush with the ground. Various methods may be used to communicate between the primary and secondary computing devices to initiate and terminate contact between the primary and secondary connectors and any method within the purview of a person of ordinary skill in the art may be used to establish communication protocol between the primary and secondary computing devices. In certain embodiments, to initiate contact between a primary and secondary connector, a communication is sent wirelessly and automatically through an onboard computer on the vehicle, by a command on a software application on a mobile computing device or by the driver pushing a button on a control panel within the vehicle to a computing device within the primary connector or charging site to initiate the charging process. Upon receiving and accepting the communication from the vehicle or driver computing device, the primary connector sends a return signal wirelessly to the computing device within the vehicle informing the vehicle and secondary connector that the charging process is to begin. Upon receiving the communication from the computing device within the primary connector or charging site, the vehicle or driver computing device sends a return communication to the primary connector or charging site computing device that initiation of the charging process has been accepted, wherein upon acceptance of the charging process. In certain embodiments, terminating contact between a primary and secondary connector may be initiated by an onboard computer on the vehicle upon the battery achieving full charge, a command entered on a software application on a mobile computing device or by the driver pushing a button on a control panel within the vehicle. Any one of these actions may result in a wireless communication being sent to a computing device within the primary connector or charging site terminate the charging process. Upon receiving and accepting the communication from the vehicle or driver computing device, the primary connector computing device sends a return wireless communication to the vehicle or driver computing device informing the secondary connector that the charging process is to be terminated. Upon receiving the communication from the primary connector computing device, the vehicle or driver computing device sends a return communication to the primary connector computing device that termination of the charging process has been accepted and that the primary and secondary connector should be disconnected.

Also provided is an automated extendable electrical charging apparatus for charging a battery on an electric vehicle. The automated extendable electrical charging apparatus includes: a vehicle mounted charging device which is mounted on a vehicle's undercarriage or chassis, wherein the extendable charging apparatus comprises an adjustment mechanism connected to a vehicle connector cover which is positioned within the vehicle when in a stowed position and which is adjusted to an extended position out from the vehicle when in an use position, wherein the vehicle connector cover comprises an electrical connection device, wherein the electrical connection device comprises an induction coil within the vehicle, wherein an electrical potential is generated within the vehicle induction coil as the vehicle passes over a roadway having an embedded induction coil through which electrical current passes through to generate an electromagnetic field, wherein the vehicle connector cover includes: a first sensor or set of sensors which faces in a downward direction towards the roadway to monitor and maintain the correct distance between the vehicle inductive coil and the inductive coil embedded within the roadway for maintaining an efficient inductive connection with the roadway; and, a second sensor or set of sensors which faces in a forward direction into the path of travel of the vehicle to detect the presence of obstacles within the path of travel of the vehicle, wherein the second sensor or set of sensors will cause the vehicle inductive coil or vehicle connector cover to retract upwards if obstacles within the path of travel are detected and downward to the extended position once the path of travel is clear.

DETAILED DESCRIPTION

Figure 1A:
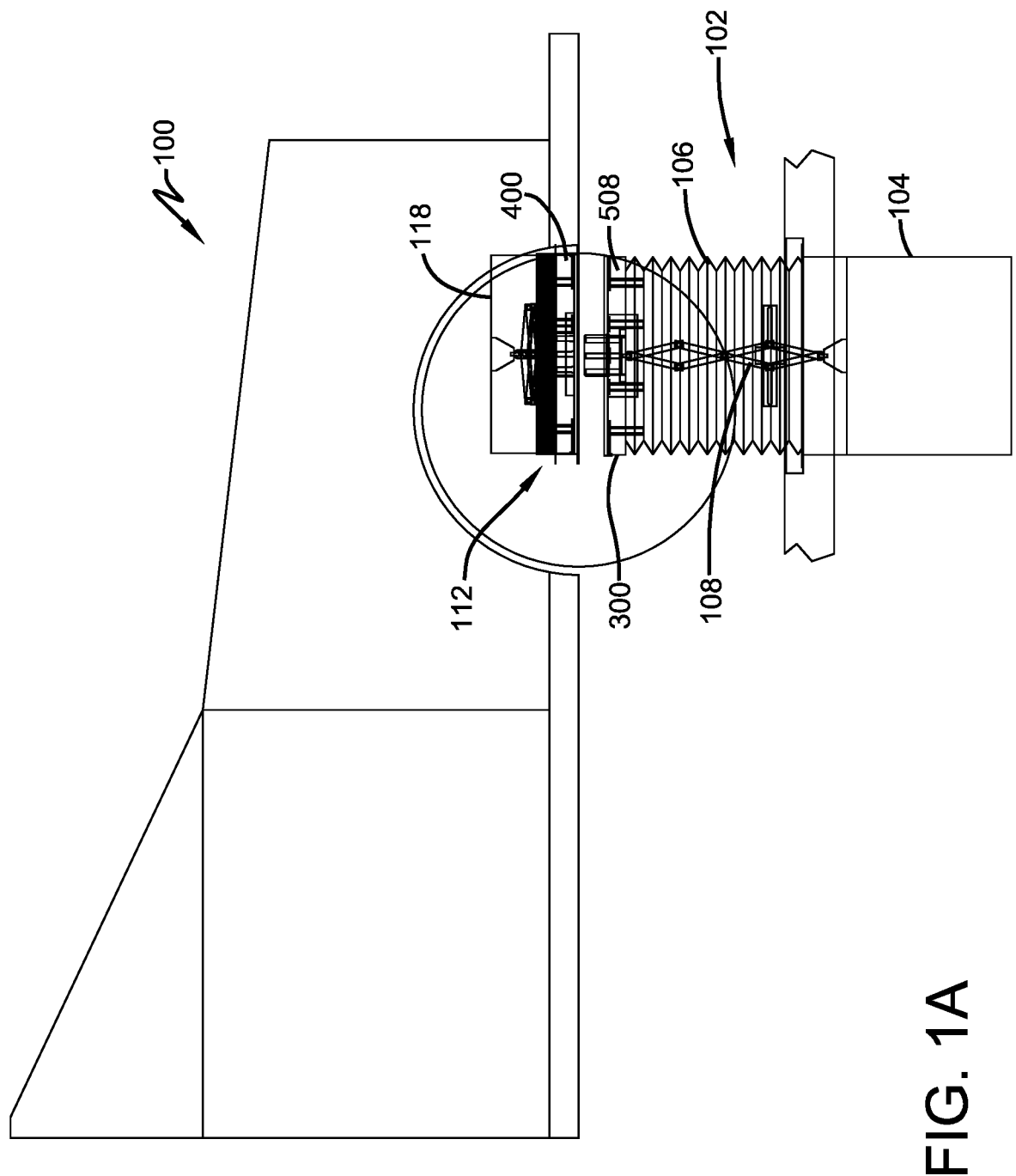
FIG. 1A is a side view of an automated electrical connection apparatus for a vehicle.

The present disclosure is directed to a hands-free plug in connection system for electric vehicles. The hands-free system may be used on pure electric vehicles or hybrid electric vehicles. The hands-free system allows for the precise positioning, alignment and connection between a primary connector on an apparatus located at a charging site with a secondary connector located on a vehicle apparatus. Connecting the primary and secondary connectors in the manner disclosed herein allows for efficient, safe and hands-free plug in or non-plug in connection for charging a battery on an electric vehicle.

Typically, a driver will pull into a charging site and generally align the vehicle with a primary connector (also referred to herein as a pop-up apparatus) at the charging site. In certain embodiments, an autonomous vehicle may perform the necessary maneuvers to locate and park the vehicle in the precise location wherein the primary connector is located. Such maneuvers may be performed with the aid of a global positioning system (GPS) or an electronic or magnetic targeting device which may or may not be accurate enough to achieve the precise positioning and alignment necessary for coupling the primary and secondary connectors.

The present disclosure is an inexpensive and simple apparatus that provides a means to mount, contain, protect and maneuver electrical connection devices located at a charging site and on a vehicle from a position flush with a mounting surface to an extended position. This allows the electrical connection devices of the pop-up apparatus to be perfectly positioned and aligned for a safe, efficient charge of the battery on an electric vehicle.

According to certain embodiments, the primary connector or pop-up apparatus is located at a charging site and is mounted in the ground with a primary induction coil attached to a primary connector cover with the top surface of the induction coil flush with the ground. In further embodiments, the primary connector may also be mounted within a wall at the charging site. The secondary connector, located on a vehicle, is in certain embodiments, mounted to the underside of a vehicle with the bottom surface of a secondary inductive coil flush with the bottom of the chassis. However, it should be understood that the secondary connector may be positioned anywhere on the vehicle. For example, the secondary connector may be positioned on the underside top, front or rear of a vehicle with the top of the secondary connector flush with the surface in which it is installed. Activation of the primary pop-up apparatus may be achieved electronically through a wireless communication sent automatically by a computer within the electric vehicle and received by a computing device associated with the primary apparatus a command transmitted through a cell phone application or a button pressed within the electric vehicle. The charging process begins with a vehicle being parked over the top of the primary inductive coil(s) at an electric vehicle charging site. Once the apparatus is activated, the primary inductive coil(s) on the primary connector will move upwards from the ground through a mechanical device to engage a secondary connector housing secondary inductive coils on a vehicle. The secondary connector is not moveable with respect to the vehicle. However, in certain embodiments, the secondary connector may include an adjustment mechanism disclosed herein which allows secondary inductive coils or other electrical connection devices to move downward from the vehicle towards the primary connector. After moving in an upward manner, the primary inductive coil(s) will then move laterally for positioning and alignment with the secondary connector located in the undercarriage of a vehicle. Likewise, the secondary inductive coil(s) on the vehicle may move laterally for positioning and alignment with the primary induction coil(s) of the primary connector at the charging site. Allowing the primary and secondary connectors to be aligned will allow for the primary and secondary induction coils to be aligned. Upon termination of the charging cycle, the inductive coil on the primary connector retracts to its original position into the ground so that its top surface is flush with the surface of the ground in which it was installed. The process described above achieves a safe and efficient charge of the battery of a vehicle without the driver ever having to exit the vehicle.

In certain embodiments, the primary and secondary connectors are connected to each other in the deployed state through corresponding induction coils installed on the primary and secondary connectors. The induction coils are installed on or within a primary connector cover and a secondary connector cover. The primary connector cover of the primary connector may be referred to as a charging site connector cover and the secondary connector cover may be referred to as a vehicle connector cover. The connector cover may be connected to the top end of an adjustment mechanism (also referred to as a lift mechanism) if employed. The primary connector cover and the secondary connector cover, in addition to as an alternative to inductive coils, may include hardwire plugin electrical connectors having all of the protocol and power connections necessary to safely charge a battery of an electric vehicle. When an electric vehicle is parked at a charging site, both vertical and lateral orientation must be achieved between the primary connector at the charging site and the secondary connector on the vehicle. Vertical orientation is achieved primarily by positioning the vehicle in the correct position over the primary connector. However, lateral orientation is also required.

Lateral orientation is especially a factor in further embodiments where the electrical connector elements (for example, male pins or female receptacles) within the primary connector cover engage corresponding electrical connector elements (for example male pins or female receptacles) within the secondary connector cover. Thus, precise alignment between the primary connector cover and the secondary connector cover is necessary so that the secondary connector elements on the vehicle or secondary connector cover align with the primary connector elements on the charging site or primary connector cover. This is accomplished by laterally moving the primary and/or secondary connector cover with respect to each other through the use of electromagnets positioned on the cover until the primary and secondary connector elements (for example, male pins on the primary connector cover and female receptacles on the secondary connector cover) align with each other. In certain embodiments, the deployment process involves pushing the male pins out of the primary connector cover to engage the female receptacles located in the secondary connector cover as the primary connector is extended by the adjustment or lifting mechanism to its fully extended in use position. Once the connection is complete, charging of the battery may commence. Upon completion of the charging cycle, the primary pins will retract back into the primary connector cover and the primary connector cover will retract back into the charging site or primary connector until it is flush with the ground surface in which it is installed. Once the primary connector cover and the secondary connector cover are safe within the respective surfaces in which they are installed, control of the vehicle is returned to the driver and the vehicle may be driven out of the site.

In certain embodiments, the primary connector cover and the vehicle or secondary connector cover may each include one side or one half of a transformer referred to as a primary transformer side and a secondary transformer side. The primary side of a transformer is positioned within the charging site or primary connector cover and is connected to a power source. A secondary side of a transformer is positioned within the vehicle or secondary connector cover and is connected to the circuitry of the vehicle to charge the battery of the electric vehicle. When a vehicle is parked at a charging site, both vertical and lateral orientation must be achieved between the primary connector cover of the charging site or primary connector and the secondary connector cover of the vehicle or secondary connector before the primary side of the transformer can be connected to the secondary side of the transformer. Vertical orientation is achieved primarily by positioning the vehicle in the correct position over the primary connector cover. Lateral orientation is achieved by laterally moving the primary and/or secondary connector covers with respect to each other through the use of electromagnets positioned on the connector covers until the primary and secondary transformer sides aligns with each other. Once perfect alignment is achieved, the primary side transformer is pushed out of the primary connector cover and engages the secondary side transformer within the vehicle or secondary connector cover. With the connection complete, the process of charging the battery may commence. Upon completion of the charging process or charging cycle, the primary transformer will retract back into the primary connector cover and the primary connector cover will retract back into the primary connector or charging site connector until it is flush with the surface in which it is installed. Once the charging site or primary connector cover and/or the vehicle or secondary connector cover are safe within the respective surfaces in which they are installed, control of the vehicle is returned to the driver and the vehicle may be driven out of the station.

In further embodiments, the vehicle may include an automated extendable charging apparatus. The automated extendable charging apparatus may be positioned anywhere on the vehicle. In certain embodiments, the automated extendable charging apparatus is positioned under the vehicle, for example, on the chassis or undercarriage of the vehicle. The automated extendable charging apparatus includes a vehicle or secondary connector cover having an induction coil and sensors for roadway charging through an induction coil embedded within the roadway and an adjustment or deployment mechanism for moving the vehicle connector cover to an extended position out from the bottom of the vehicle toward the roadway. The adjustment or deployment mechanism may be a scissor mechanism, a power assisted push mechanism as disclosed herein or any other type of adjustment or deployment mechanism within the purview of a person of ordinary skill in the art. The vehicle connector cover may include a first set of sensors which face downwards toward the roadway. The first set of sensors are used to determine and maintain the correct distance between the induction coils on the vehicle connector cover and the induction coils within the roadway for an efficient inductive connection. If adjustment is required, the adjustment mechanism will raise or lower the vehicle connector cover with respect to the roadway. The vehicle connector cover may also include a second set of sensors facing laterally out from the vehicle (for example, in a forward, a backward direction or any other direction). The second set of sensors may be used to scan for objects in the path between the vehicle connector cover and the roadway. If an object is determined to be in the path between the vehicle connector cover and the roadway, the vehicle connector cover will retract back to towards the chassis or undercarriage of the vehicle and may be fully retracted back to be flush with the chassis or undercarriage of the vehicle. Once the obstacles are cleared, the vehicle connector cover may be deployed or extended and charging may be resumed.

Figure 7:
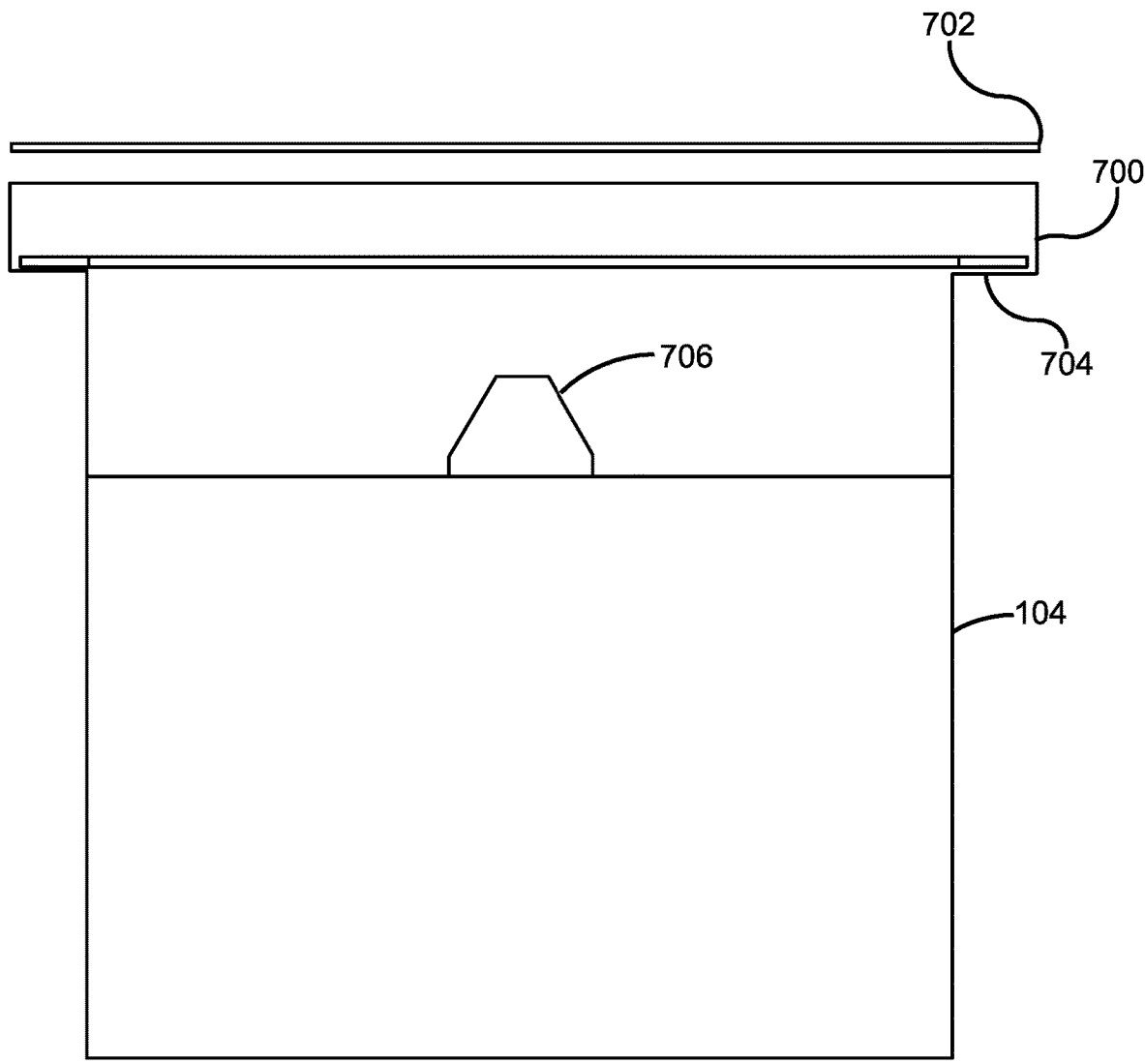
FIG. 7 is a side view of a container housing a primary connector at a charging site.

FIG. 1A illustrates an electric vehicle (100) positioned or parked over an automated electrical connection apparatus which may also be referred to as a pop-up apparatus or primary connector (102). The primary connector (102) fits within a container (104) positioned under a ground surface and includes bellows (106), a scissor mechanism (108) positioned within the bellows for extending and retracting a primary connector cover (300) between an upward and downward position and a boot cover (508) attached to the primary connector cover (300). The container, which is illustrated within FIG. 7, includes a bottom end, at least one side wall and an open top. At the top of the container is a crown (700). The crown (700) provides a surface for the primary connector cover (300) and a seal bed positioned at the top of the container (104) to prevent water and contaminants from entering the container (104). The primary connector cover (300) is attached to the top of the bellows (106). At the top of the crown (700) is an upper or outer retainer ring (702) which stops the bottom end of the bellows (106) from exiting the crown (700) as the bellows (106) and the primary connector cover (300) are deployed out of the crown (700) by the scissor mechanism (108). As shown in FIG. 7, the container includes a scissor support bracket (706) for supporting the scissor mechanism (108) within the bellows (106).

Figure 9A:
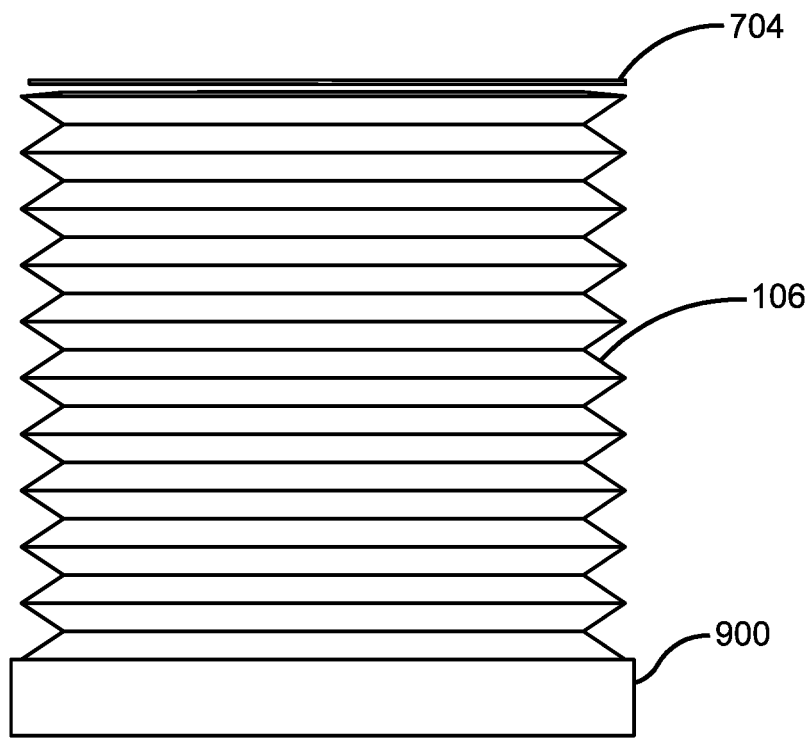
FIG. 9A is a side view of bellows present within a primary connector at a charging site in an extended state.
Figure 11A:
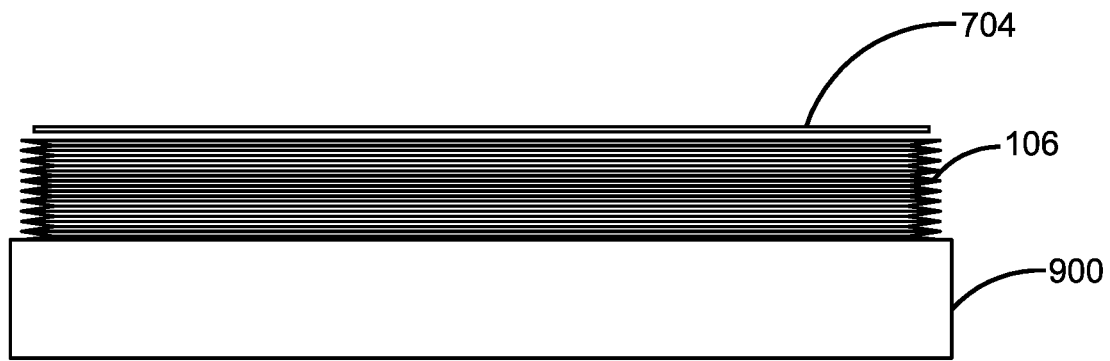
FIG. 11A is a side view of bellows present within a primary connector at a charging site in a compressed state.

As shown in FIGS. 9A and 11A, the bellows (106) of the primary connector (102) include a top end and a bottom end, at least one wall, an open bottom and an open top. The bottom end of the bellows (106) includes a bellows flange (900). The bellows flange (900) acts as a seal against the inside wall of the crown (700) and rests above the scissor actuator support bracket (706) shown within FIG. 7. An inner retainer ring (704) positioned within the crown (700) is attached to the bellows. The top of the crown (700), as mentioned above, includes an outer retainer ring (702).

Figure 2:
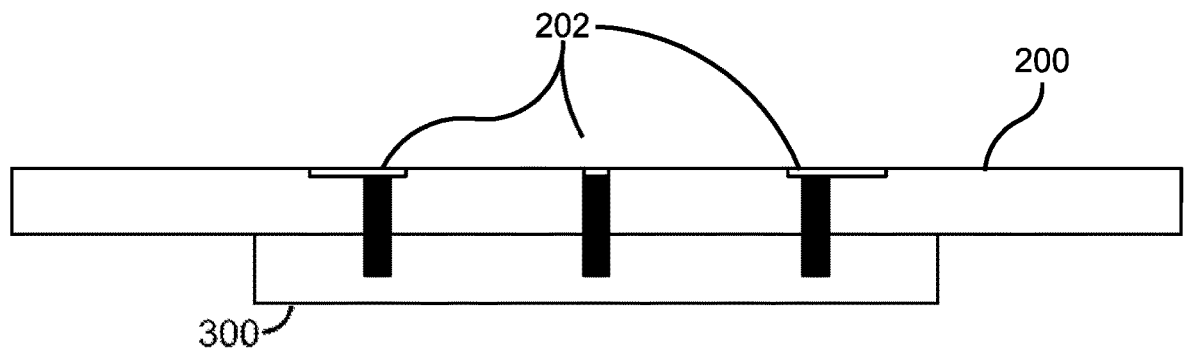
FIG. 2 is a side view of a connector cover having an induction coil mounted on top of the cover.
Figure 3A:
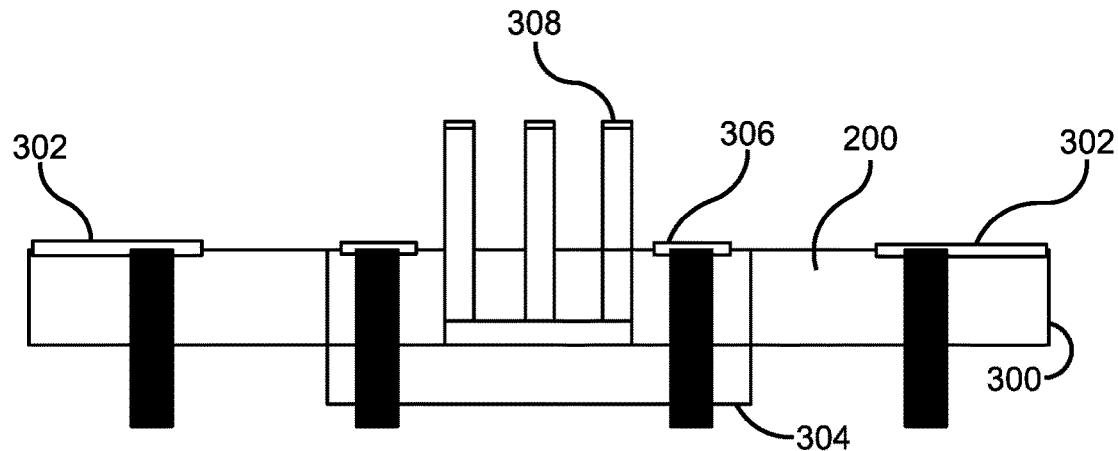
FIG. 3A is a side view of a connector cover having male pins.
Figure 3B:
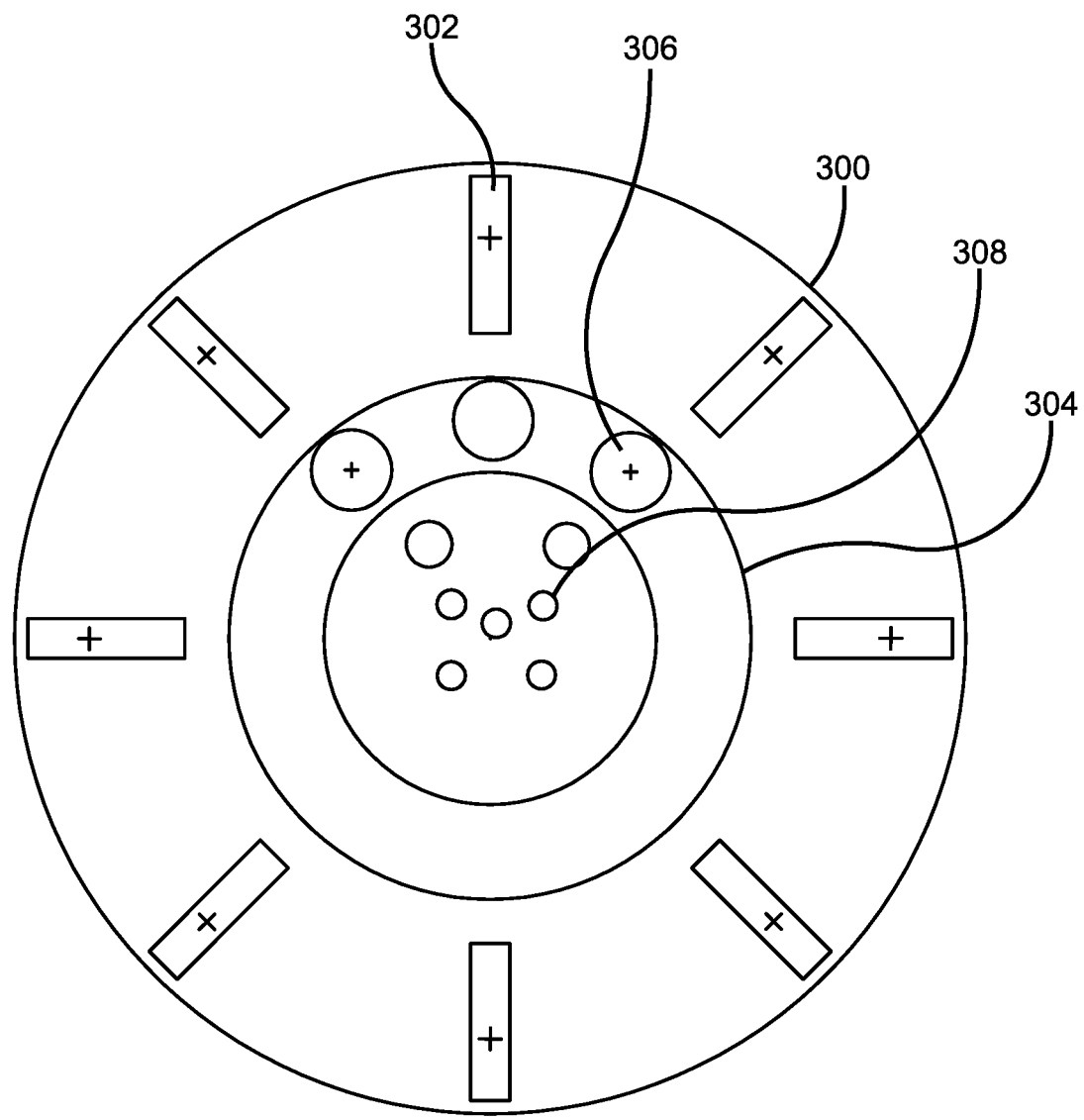
FIG. 3B is a top view of a connector cover having male pins.

Also contained within the crown (700) of the primary connector or pop-up apparatus (102) is the primary connector cover (300). The primary connector cover (300) of the primary connector (102) is shown within FIGS. 3A and 3B. FIG. 2 illustrates a connector cover (300) having an induction coil (200) mounted thereon. The induction coil (200) includes electromagnets (202) which pass therethrough to the connector cover (300). Thus, in certain embodiments, the primary connector cover (300) includes an inductive charging coil mounted to the surface of the primary connector cover (300). The primary connector cover (300) shown in FIGS. 3A and 3B includes electromagnets (302). In further embodiments, the primary connector cover (300) includes a primary hard wire plugin device integrated within the cover (300). This is illustrated within FIGS. 3A and 3B. As shown within FIGS. 3A and 3B, the hard wire plugin device includes a housing (304), clocking permanent magnets (306) and male pins (308) which are slidable within the housing (304). The housing (304) of the hard wire plugin device is a nonconductive disk that is integrated within the cover (300) in such a manner that it is rotatable within the cover (300) so that the male pins (308) will line up with a corresponding connector element of the vehicle charging unit as will be described below.

The electric vehicle (100) shown in FIG. 1A also includes a vehicle connector, also referred to as a secondary connector (112). The vehicle or secondary connector (112) fits within a container (118) on the vehicle and includes a vehicle connector cover or secondary connector cover (400) having an electrical connection device such as an inductive coil, male pins or female receptacles and/or a secondary transformer side). In an alternative embodiment as shown within FIG. 1B, the secondary connector may include and adjustment or deployment mechanism comprising bellows (114) and a scissor mechanism (116) mounted to the inside of the container (118). The scissor mechanism is connected to the secondary connector cover (400) and extends the secondary connector cover (400) downward when deployed to connect to the secondary connector cover to the primary connector cover (300). Thus, the scissor mechanism (116) is used for extending and retracting the secondary connector cover between an upward and downward position. As will be described in greater detail below, the secondary connector cover (400) is attached to the bottom of the bellows (114) within the crown (800) of the container (118) and connects to the primary connector cover (300) of the primary connector (102).

Figure 1B:
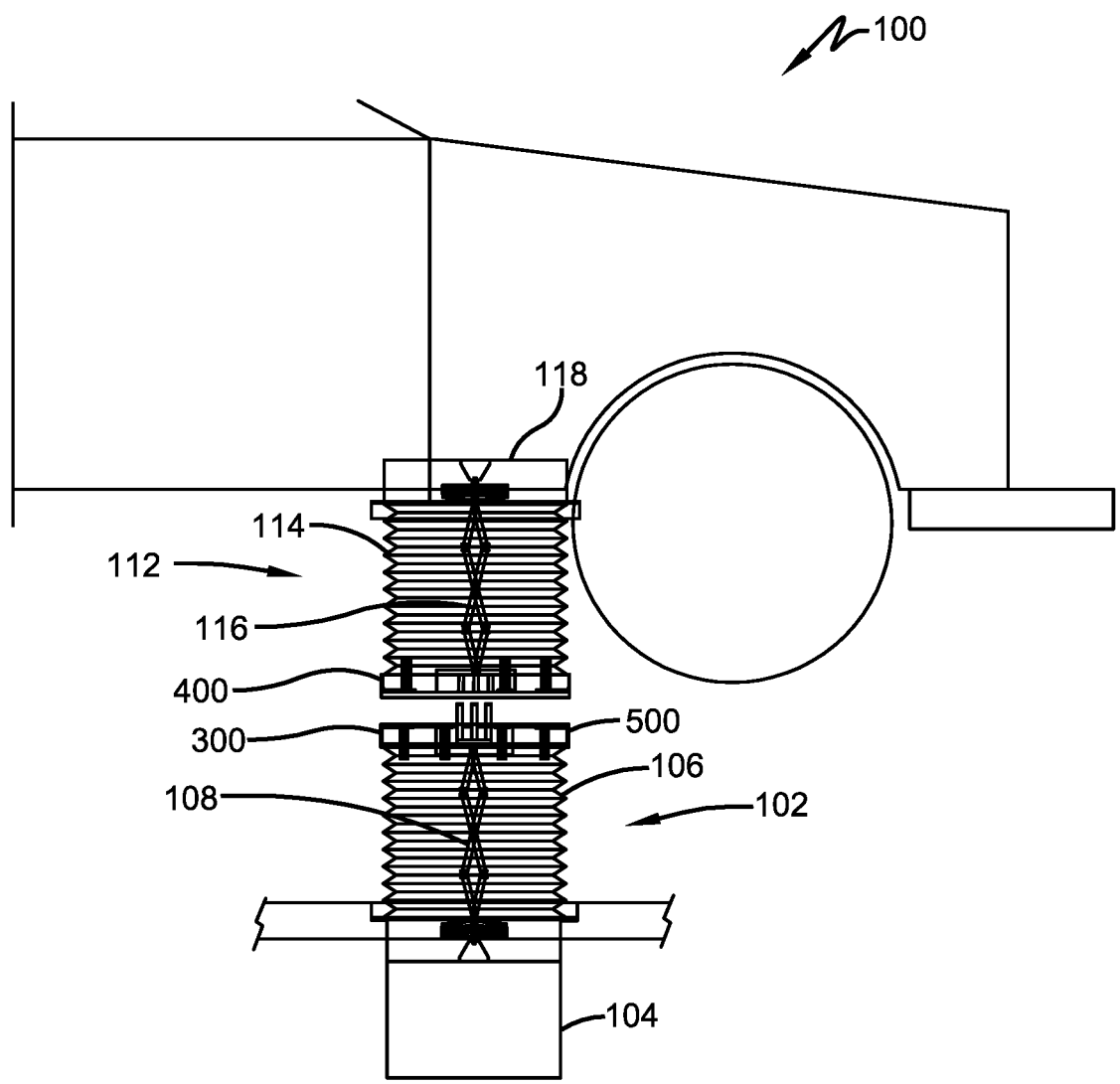
FIG. 1B is a side view of an automated electrical connection apparatus for a vehicle.
Figure 8A:
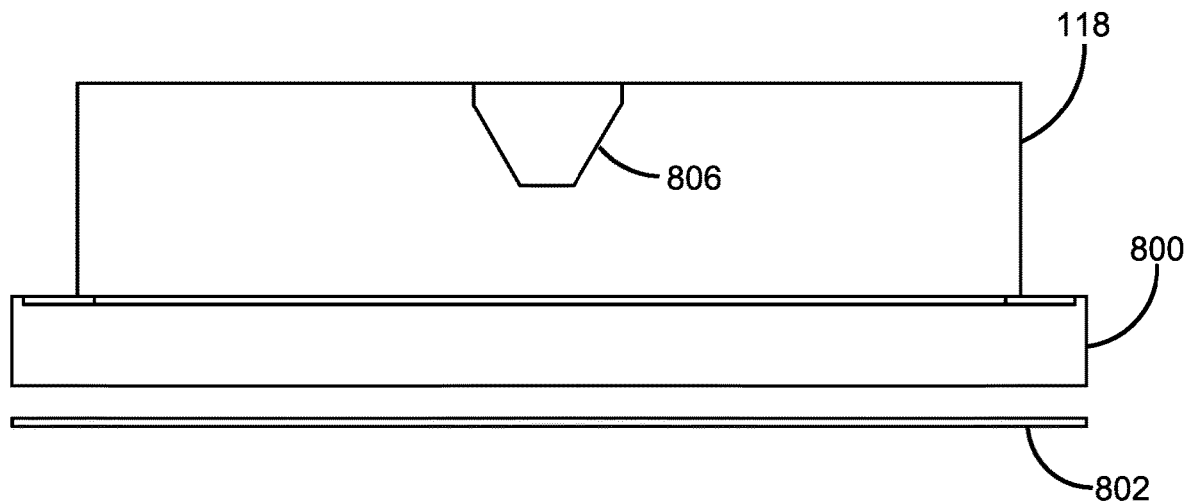
FIG. 8A is a side view of a container housing a secondary connector on a vehicle.
Figure 8B:
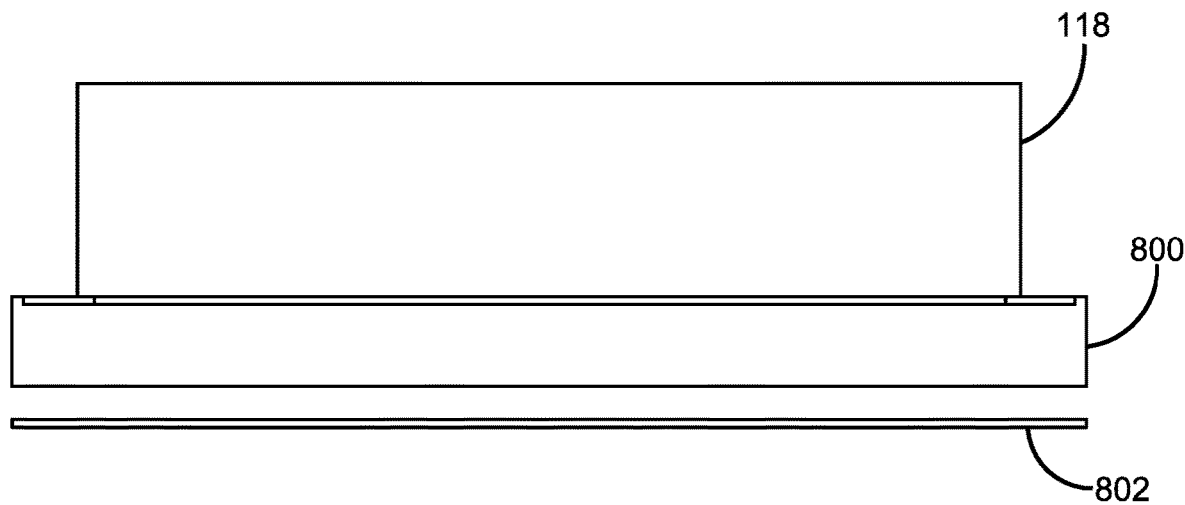
FIG. 8B is a side view of a container housing a secondary connector on a vehicle.

With respect to the embodiment illustrated within FIG. 1B, the container (118), which is illustrated within FIG. 8, includes a top end, at least one side wall and an open bottom. At the bottom of the container is a crown (800). The crown (800) provides a surface for the secondary connector cover (400) and a seal bed positioned at the bottom of the container (118) to prevent water and contaminants from entering the container. The secondary connector cover (400) is attached to the bottom of the bellows within the crown (800). At the bottom of the crown (800) is an outer retainer ring (802) which stops the top end of the bellows (114) from exiting the crown (800) as the bellows (114) are deployed out of the crown (800) by the scissor mechanism (116) and the charging unit cover (400). As shown in FIG. 8, the top portion of the container includes a scissor support bracket (806) for supporting the scissor mechanism (116) within the bellows (114).

Figure 9B:
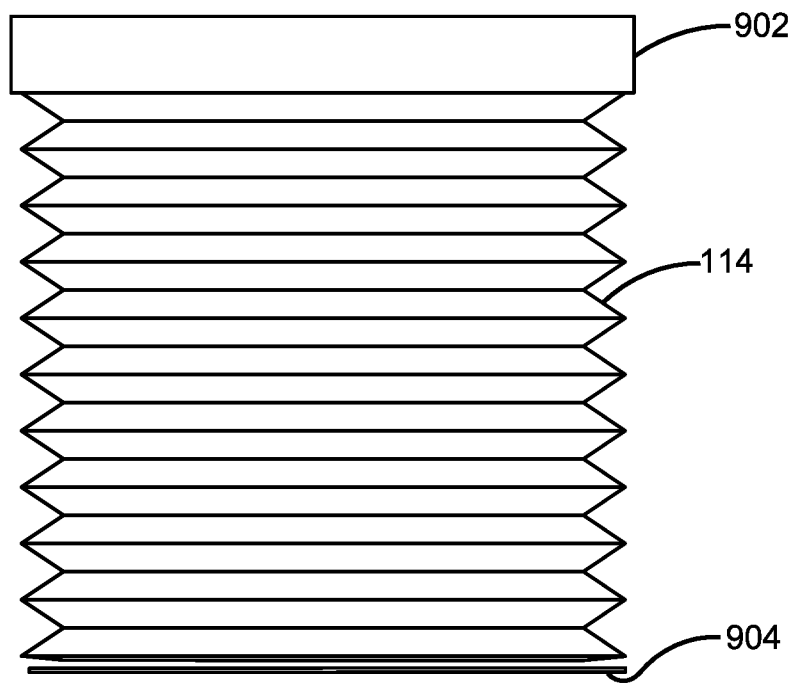
FIG. 9B is a side view of bellows present within a secondary connector on a vehicle.
Figure 10:
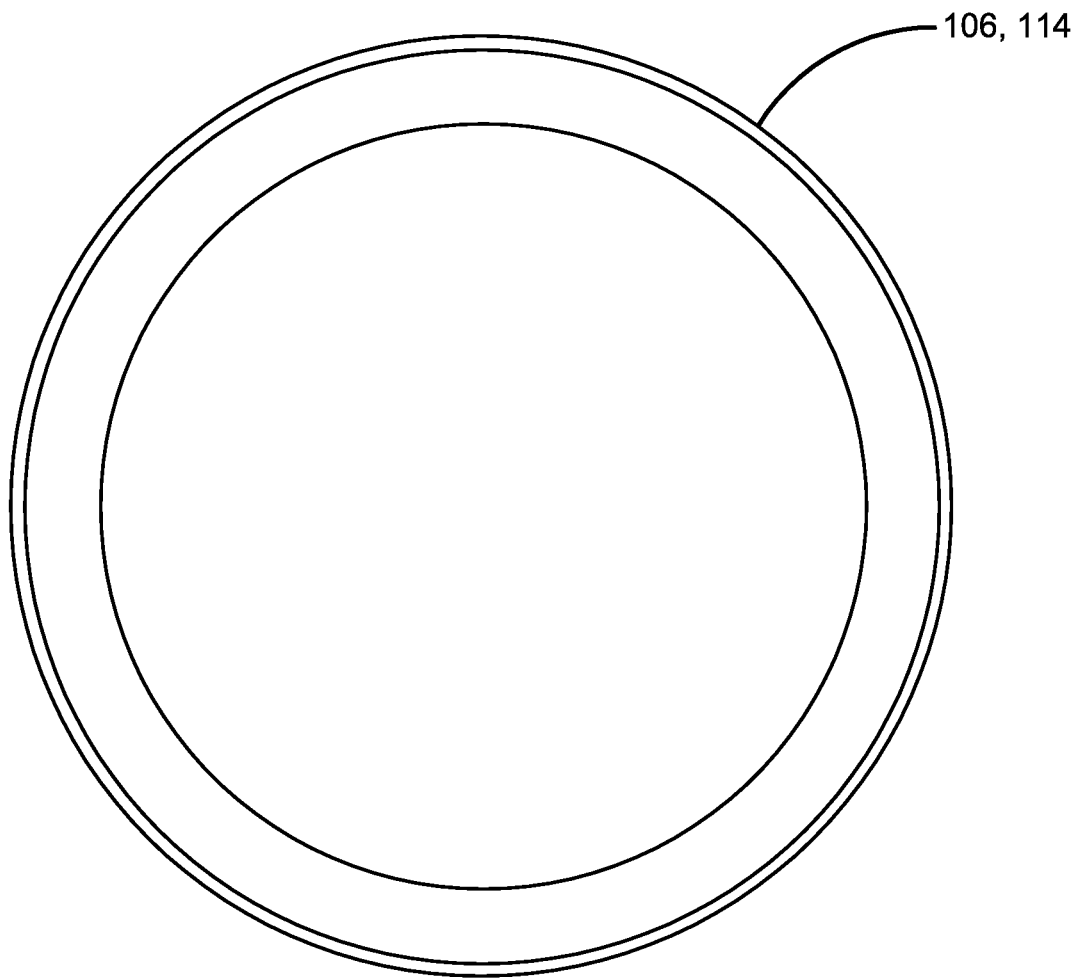
FIG. 10 is a top view of bellows.
Figure 11B:
FIG. 11B is a side view of bellows present within a secondary connector on a vehicle in a compressed state.

As shown in FIGS. 9B and 11B, the bellows (114) include a top end and a bottom end, at least one wall, an open bottom and an open top. The top end of the bellows (114) includes a bellows flange (902). The bellows flange (902) acts as a seal against the inside wall of the crown (800) and rests below the scissor actuator support bracket (806) shown within FIG. 8. The inner retainer ring (904) is attached to the bellows flange (900).

As discussed above, the secondary connector cover (400) is employed both in the automated electrical connection apparatus shown in FIG. 1A and the automated electrical connection apparatus shown in FIG. 1B. The secondary connector cover is contained within the crown (804) of the container (118). In certain embodiments, the secondary connector cover includes an inductive coil. FIG. 2 shows a connector cover (300) having an induction coil (200) mounted thereon. In further embodiments, the secondary connector cover (400), as shown within FIGS. 4A and 4B, includes electromagnets (402).

Figure 4A:
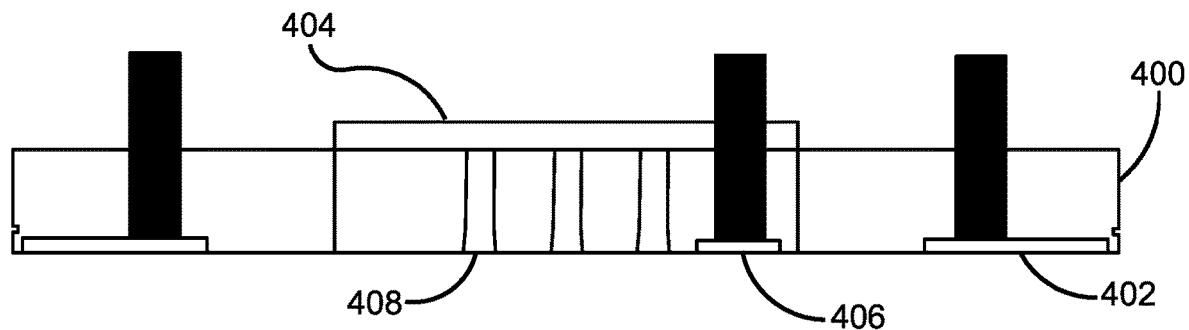
FIG. 4A is a side view of a connector cover having female receptacles.
Figure 4B:
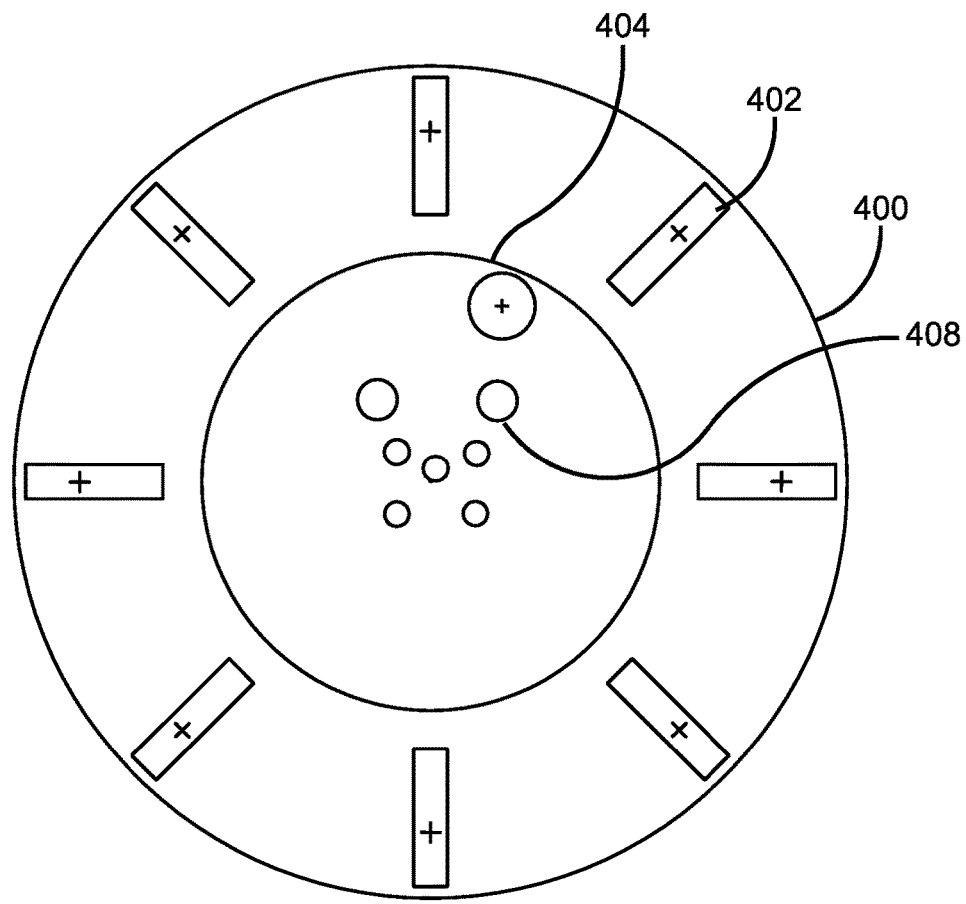
FIG. 4B is a top view of a connector cover having female receptacles.
Figure 5A:
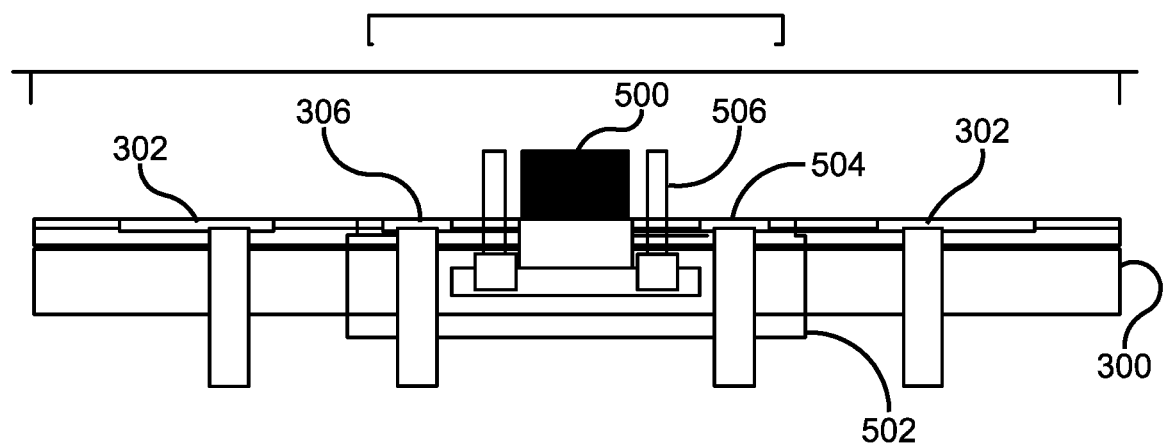
FIG. 5A is a side view of a connector cover having a first transformer side.
Figure 5B:
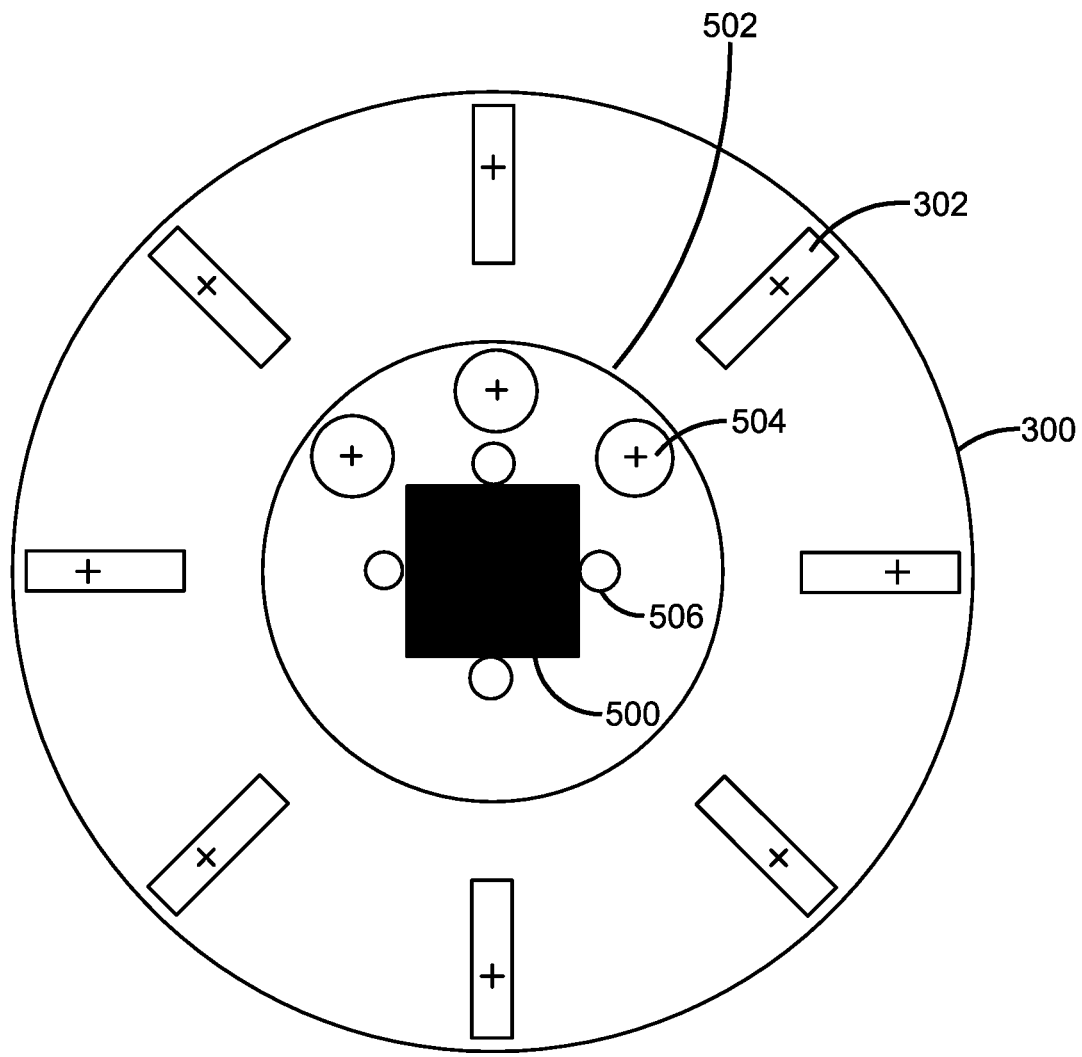
FIG. 5B is a top view of a connector cover having a first transformer side.
Figure 6A:
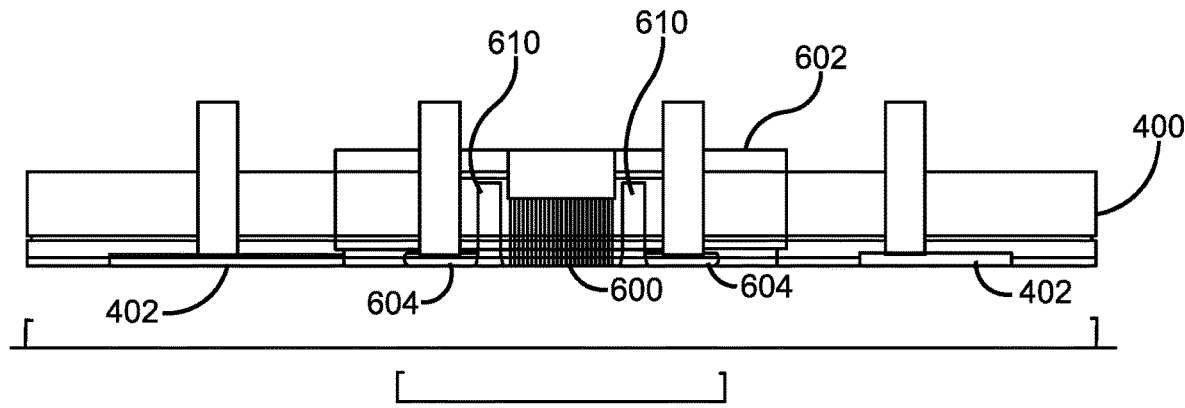
FIG. 6A is a side view of a connector cover having a second transformer side.
Figure 6B:
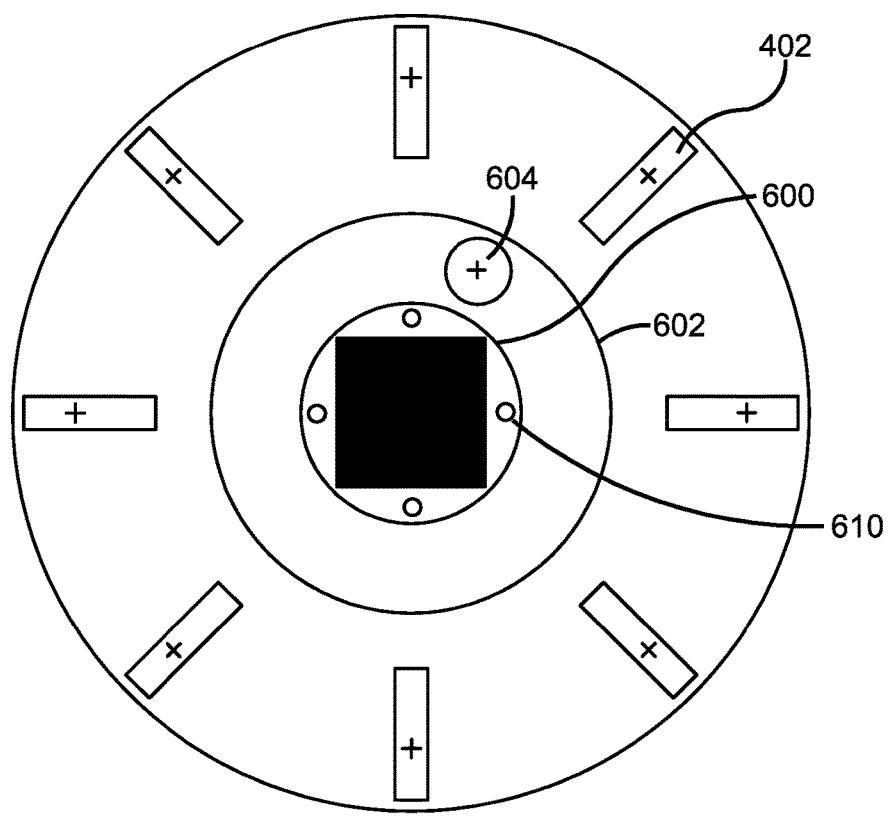
FIG. 6B is a top view of a connector cover having a second transformer side.

In the embodiments shown within FIGS. 4A and 4B, the secondary connector cover (400) includes a secondary hard wire plug in device integrated within the secondary connector cover (400). The hard wire plug in device includes a housing (404) which includes clocking permanent magnets (406) and female receptacles (408). The housing (404) of the hard wire plug in connector is a nonconductive material that is integrated within the secondary connector cover (400). In certain embodiments, the housing (404) is a nonconductive disk that is rotatable within the cover (400) so that the female receptacles (408) will line up with the male pins (308) of the primary connector cover. The primary connector cover (300) includes a corresponding primary hard wire plug in device integrated within the primary connector cover (300). The hard wire plug in device includes a housing (304) which includes clocking permanent magnets (306) and male pins (308). The housing (304) of the hard wire plug in connector is a nonconductive material that is integrated within the primary connector cover (300). In certain embodiments, the housing (304) is a nonconductive disk that is rotatable within the cover (300) so that the male pins (308) will line up with the female (408) of the secondary connector cover. In view of the description provided above, it is to be understood that a rotatable nonconductive disk may be incorporated in either the primary connector cover (300) or the secondary connector cover (400) or both the primary and secondary connector covers (300 and 400) and that rotation of at least one of the nonconductive disks is enabled by the clocking permanent magnets (306) and (406).

In certain embodiments, the male pins (308) of the primary connector cover are capable of sliding in and out of the primary connector cover housing (304) so that the pins enter the female receptacles of the secondary connector cover (400). Once the secondary connector cover (400) is in contact and aligned with the primary connector cover (300), the male pins (308) extend or are pushed into the female receptacles (408) by the adjustment or lifting mechanism including but not limited to a scissor mechanism (108) or a power assisted push up mechanism (2700) to establish a hard wire plugin connection. The male pins (308) and female receptacles (408) correspond in function with one another so that they may be low power, high power or protocol communication connections. In certain embodiments, the orientation of the male pins and female receptacles may be reversed so that the male pins are located on the secondary connector cover and the female receptacles are located on the primary connector cover.

In further embodiments, the primary connector cover (300), includes a primary transformer side (500) integrated within the cover (400). Likewise, the secondary connector cover (400) includes secondary transformer side (600) integrated within the secondary connector cover (400). The incorporation of transformers as an electrical connection device within the primary and secondary connection covers may be an alternative to or in addition to the incorporation of inductive coils and plug in connectors as mentioned above. Embodiments transformers as an electrical connection device are illustrated within FIGS. 5a, 5b, 6a and 6b. As shown within FIGS. 5a, 5b, 6a and 6b, the primary transformer side (500) and the secondary transformer side (600) when engaged form a single transformer unit. The primary side of the transformer (500) on the primary connector (102) includes a primary device housing unit (502), clocking permanent magnets (504) and protocol pins (506) surrounding the transformer (500). The secondary side of the transformer (600) on the secondary connector (112) on the vehicle includes a secondary device housing unit (602), clocking permanent magnets (604) and receptacles (610) surrounding the transformer. The primary and secondary device housing unit (502 and 602) is a nonconductive housing what is integrated respectively within the primary connector cover (300) and the secondary connector cover (400). In certain embodiments, the primary device housing unit (502) and the secondary device housing unit (602) includes a nonconductive disk that is rotatable with respect to the primary connector cover (300) and the secondary connector cover (400). In view of the description provided above, it is to be understood that a rotatable nonconductive disk may be incorporated in either the primary connector cover (300) or the secondary connector cover (400) or both the primary and secondary connector covers (300 and 400)

and that rotation of at least one of the nonconductive disks is enabled by the clocking permanent magnets (306) and (406).

In certain embodiments, the primary side of the transformer (500) slides in and out of the primary connector cover housing unit (502) so that primary side of the transformer is flush with the surface of the primary connector cover (300) when in a non-use condition or stowed configuration and is in an extended position outward from the primary connector cover (300) when in an in use position. Movement of the primary side transformer (500) between an extended and retracted position within the primary connector cover (300) is accomplished through use of the adjustment or lifting mechanism of the pop-up apparatus. The secondary side of the transformer (600) is mounted flush with the surface of the secondary connector cover housing unit (602). As the primary side of the transformer (500) within the electric charging unit cover (400) and the secondary side of the transformer (600) within the vehicle charging unit cover (300) moves toward each other, the nonconductive disk housing the primary side transformer (500) and/or the nonconductive disk housing the secondary side transformer (600) will rotate so that the primary side transformer (500) and the secondary side transformer (600) are in alignment. Rotation is accomplished through clocking permanent magnets (504 and 604). Once the primary and secondary sides of the transformer (500 and 600) are aligned, the primary side of the transformer (500) is pushed into the secondary side of the transformer (600) to form one transformer.

The primary connector cover (300) housing the primary electrical connection device (e.g., at least one of an inductive coil, plug in connector or a transformer) is mounted in the ground and is connected to a power source. The electrical connection device of the primary connector cover (300) and the secondary connector cover (400) correspond in function with one another to establish a low power, high power or protocol communication connection. In the embodiment illustrated within FIG. 1A, the secondary connector is mounted to the underside of the chassis of a vehicle so that the secondary connector cover (400) is flush with the bottom of the vehicle and the electrical connection device on the secondary connector cover (400) is connected to the circuitry that charges the battery of the vehicle.

Figure 12:
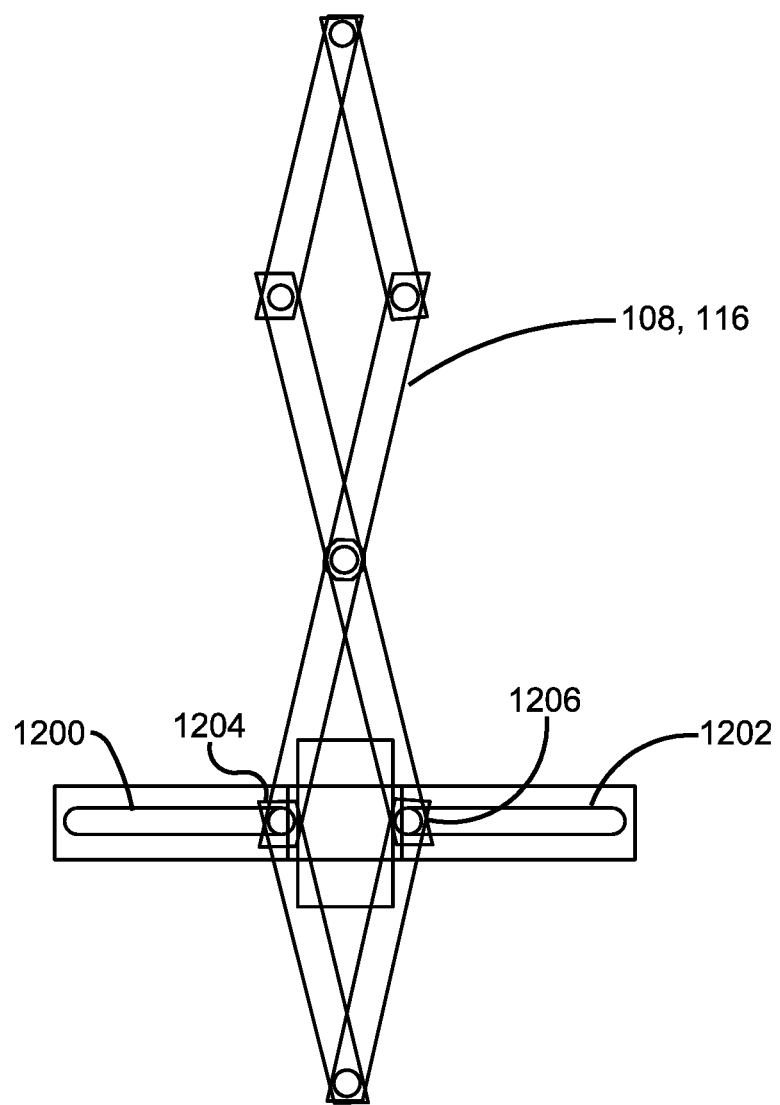
FIG. 12 is a side view of a scissor mechanism that may be utilized within the primary connector at a charging site or a secondary connector on a vehicle.
Figure 13:
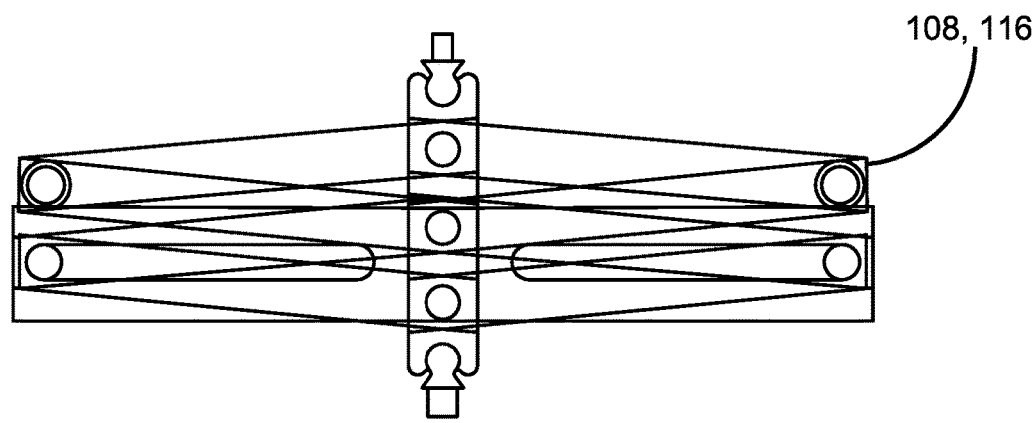
FIG. 13 is a side view of the scissor mechanism of FIG. 12 in a compressed state.
Figure 14:
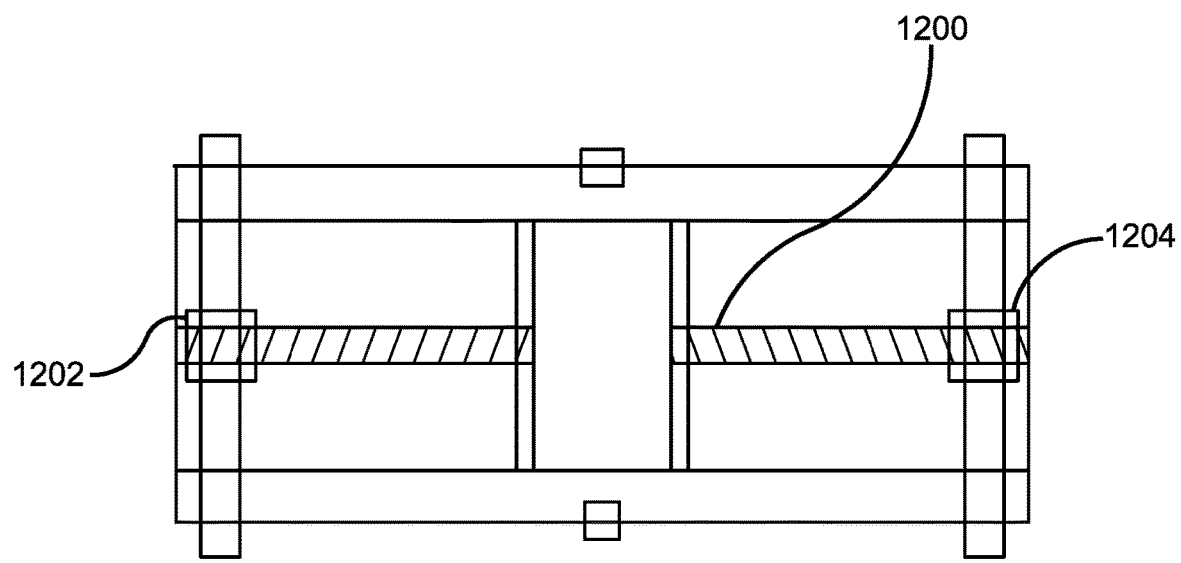
FIG. 14 is a top view of a scissor mechanism.
Figure 15:
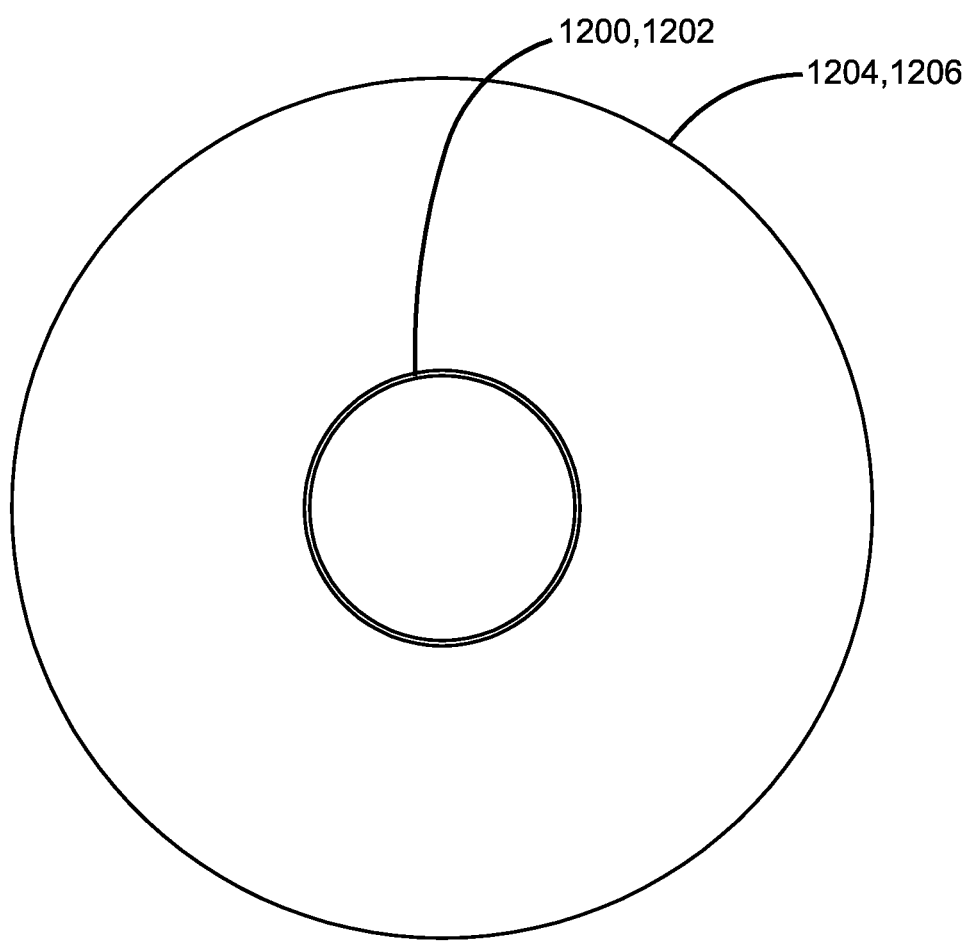
FIG. 15 is a top view of a nut and screw of a scissor mechanism.
Figure 16:
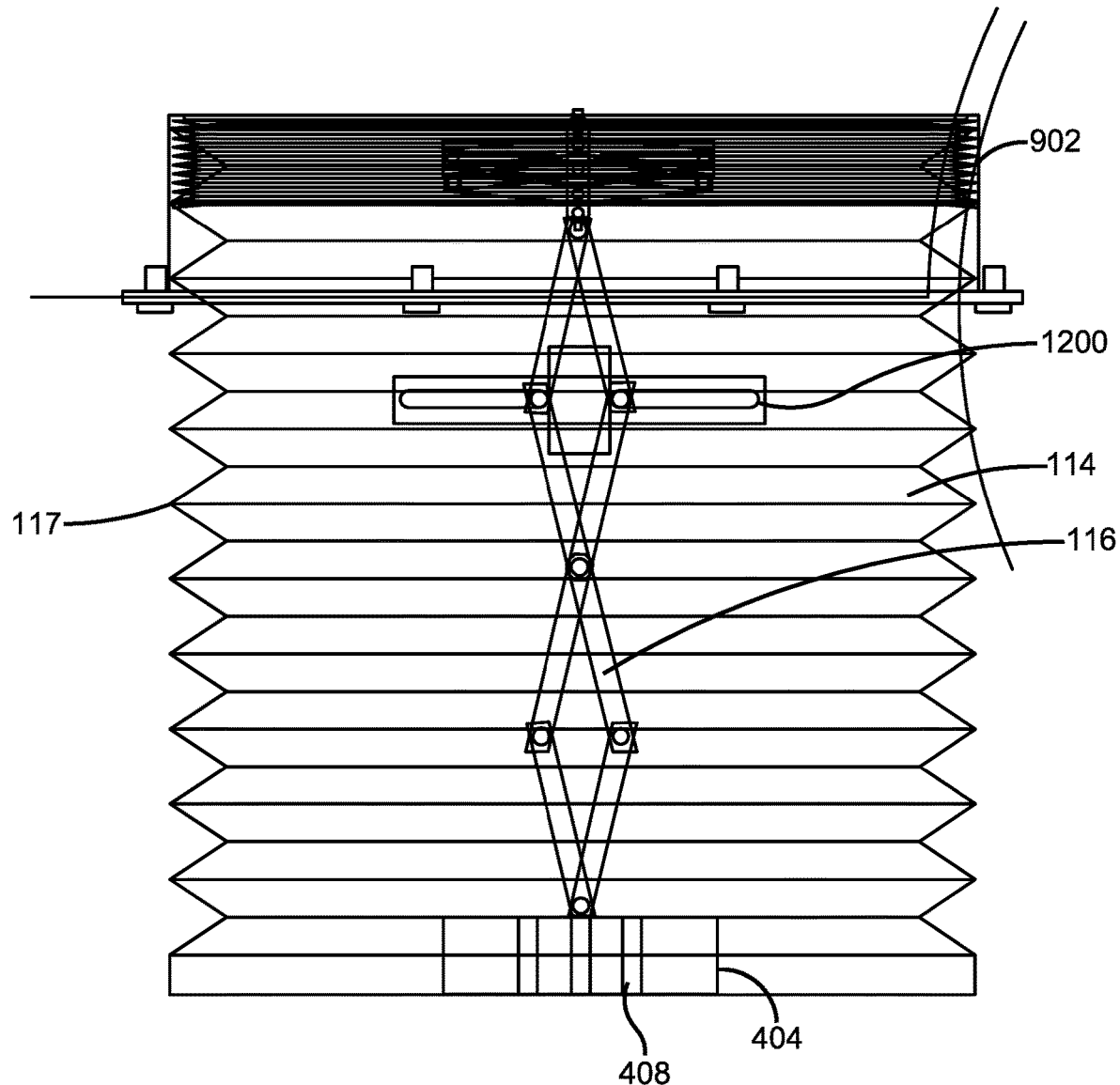
FIG. 16 is a side view of a secondary connector.
Figure 17:
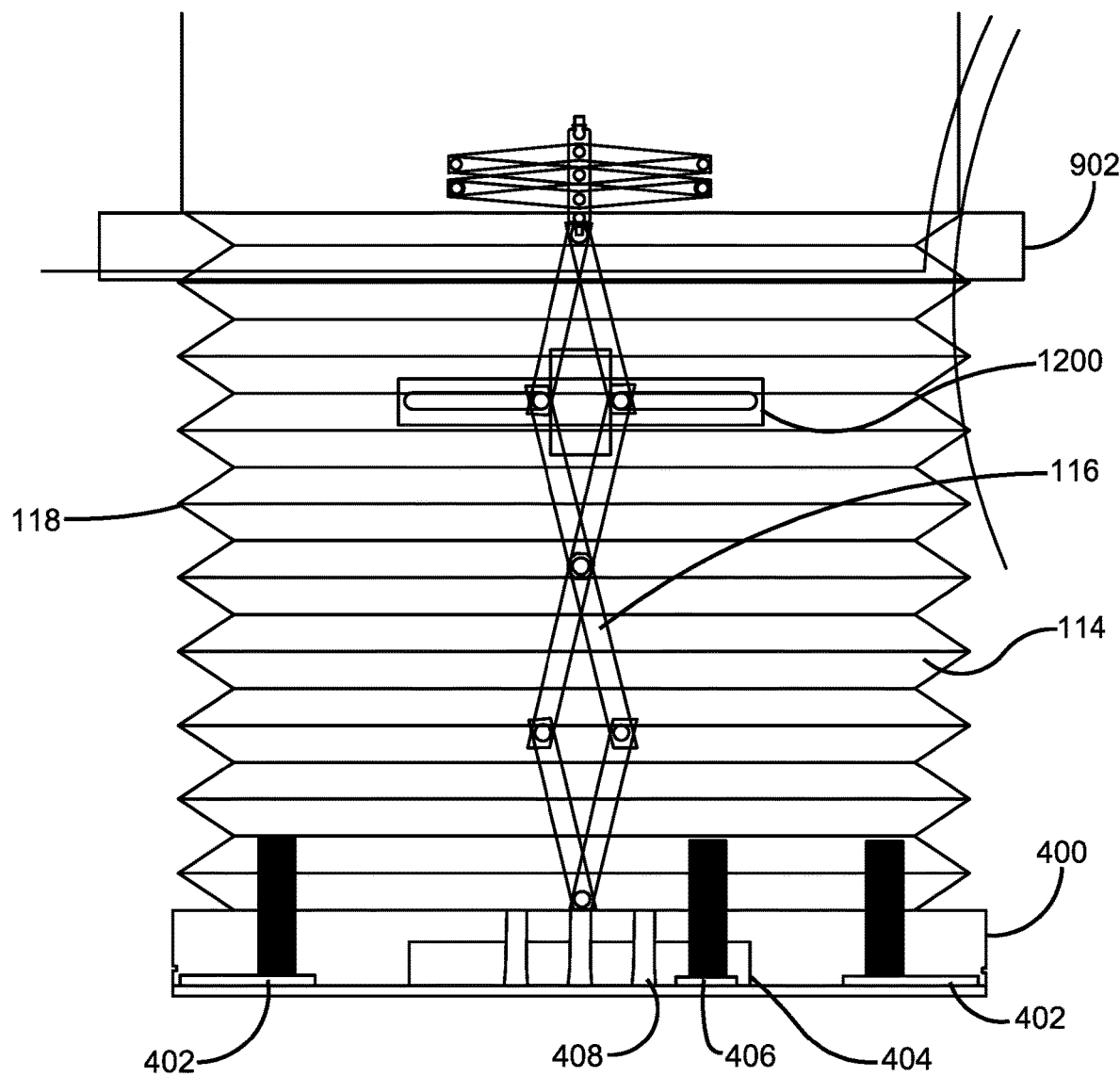
FIG. 17 is a side view of a secondary connector.
Figure 18A:
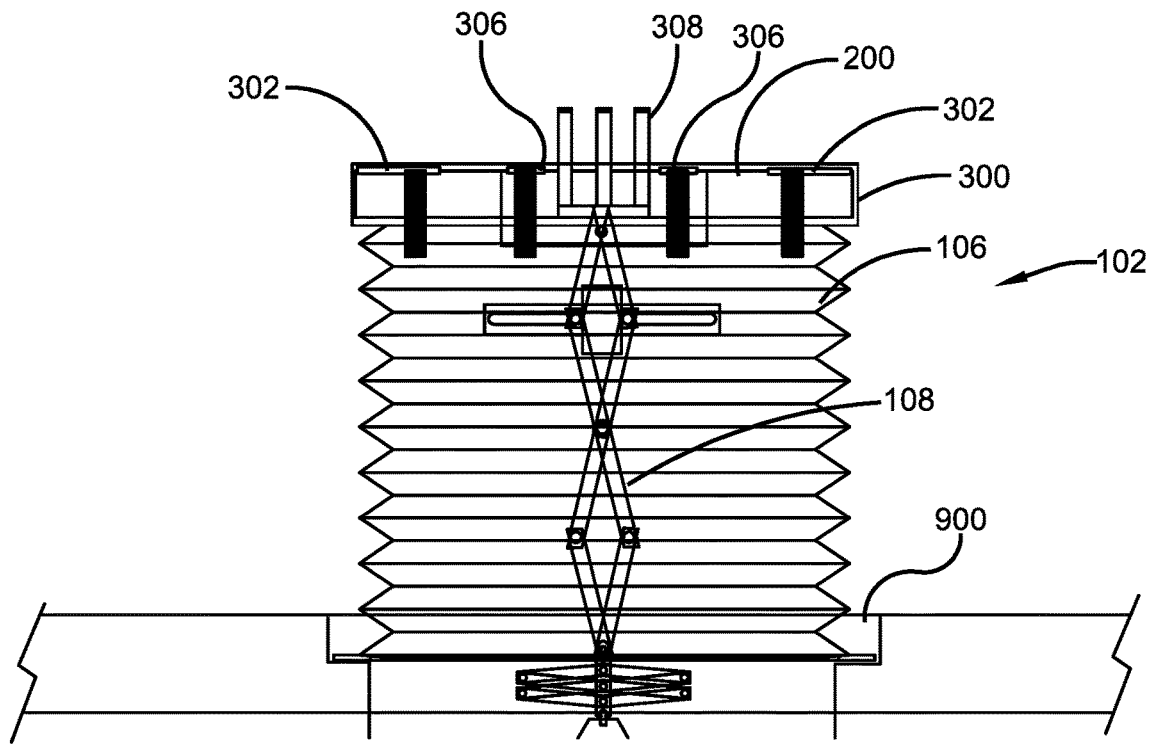
FIG. 18A is a cross-sectional side view of a primary connector.
Figure 18B:
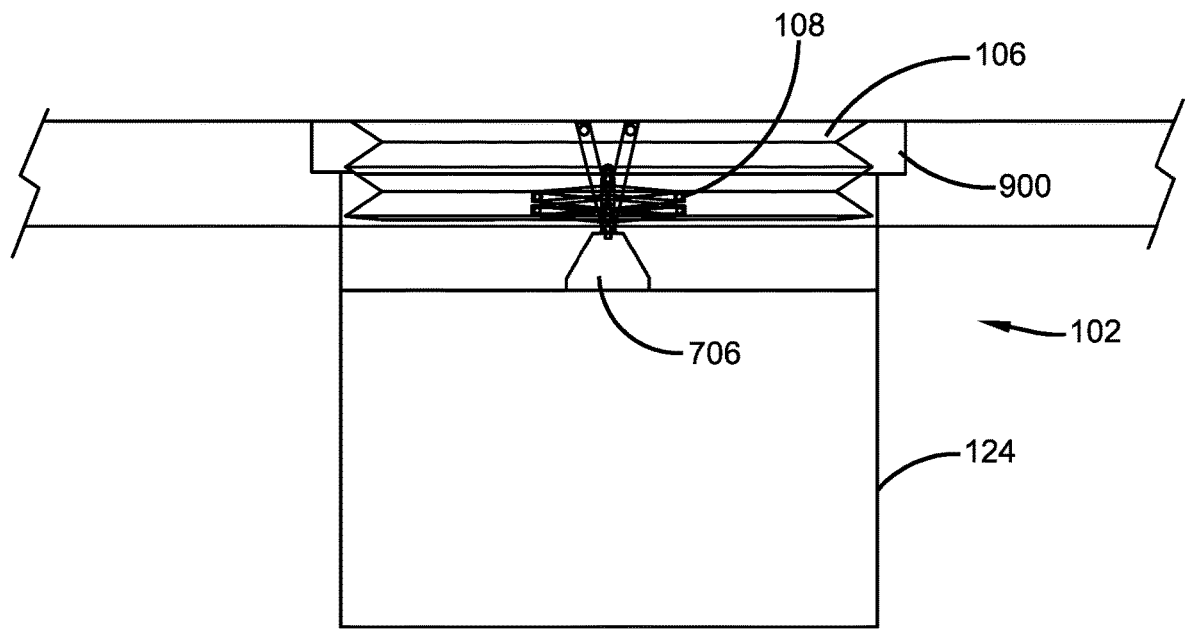
FIG. 18B is a cross-sectional side view of a primary connector.

The scissor mechanism (108 and optionally 116) that allows for vertical movement of the primary connector and optionally, the secondary connector is illustrated within FIGS. 12, 13, 14, 16, 17, 18A, 18B, 19, 25 and 26. FIG. 18A illustrates the scissor mechanism (108) installed on a primary connector pop-up apparatus (102) and contained within bellows (106). The scissor mechanism (108) of FIG. 18A is in an extended state or configuration. FIG. 18B illustrates the scissor mechanism (108) of FIG. 18A in a retracted state or configuration wherein the apparatus is positioned within the ground or under the ground and wherein the primary connector cover includes male pins which are flush with the ground. The top end of the scissor mechanism is connected to the primary connector cover and/or optionally, a secondary connector cover in embodiments where an adjustment or scissor mechanism is employed as a component of the secondary connector. As mentioned above, the scissor mechanism (108 and optionally 116) includes a scissor support bracket (706, 806) which connects a first end of the scissor mechanism to the bottom of the container (104, 118) through a first universal joint. The primary connector scissor mechanism and the optional vehicle secondary scissor mechanism also include a second end which is connected to the primary connector cover (300) or the secondary connector cover (400) of the vehicle by a second universal joint. As shown in FIGS. 12 and 14, the scissor mechanism includes a screw (1200, 1202) and motor to turn the screw (1200, 1202). A first screw (1200) and a second screw (1202) are respectively connected to first and second nuts (1204 and 1206) are connected to a screw which allows the scissor mechanism (108 and 116) to move between a retracted position and an extended position. FIG. 15 shows a nut (1204, 1206) engaged with a screw (1200, 1202). FIG. 13 shows a scissor mechanism (108, 116) in a compressed or retracted state.

Figure 19A:
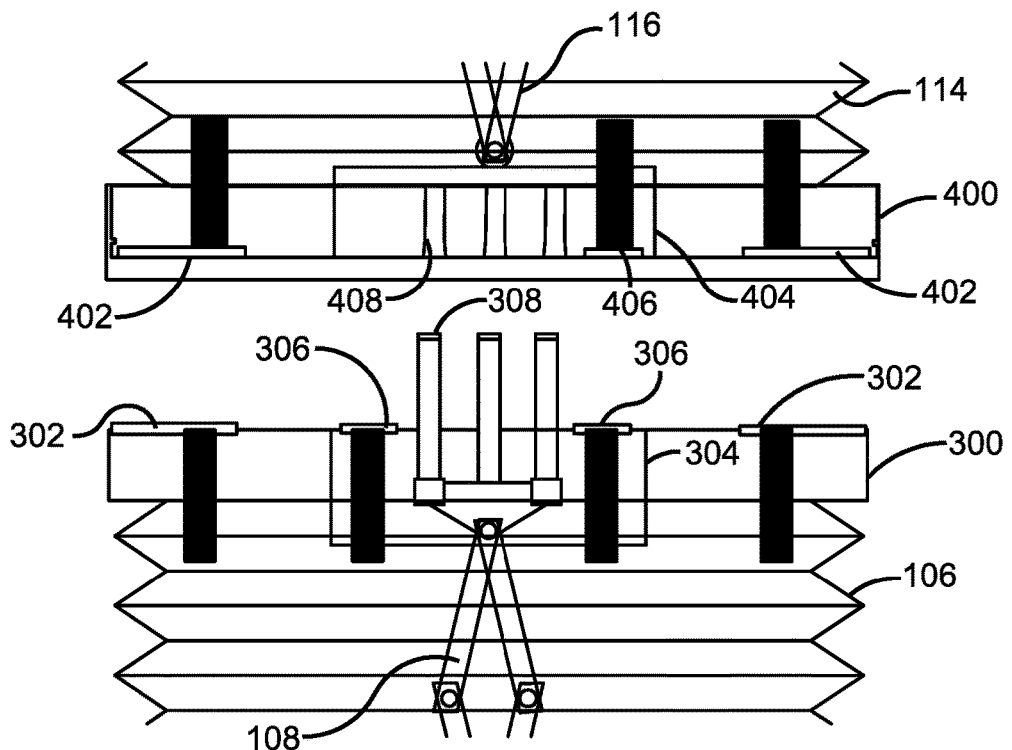
FIG. 19A is a cross-sectional side view of an exemplary connection between a primary connector and a secondary connector.
Figure 19B:
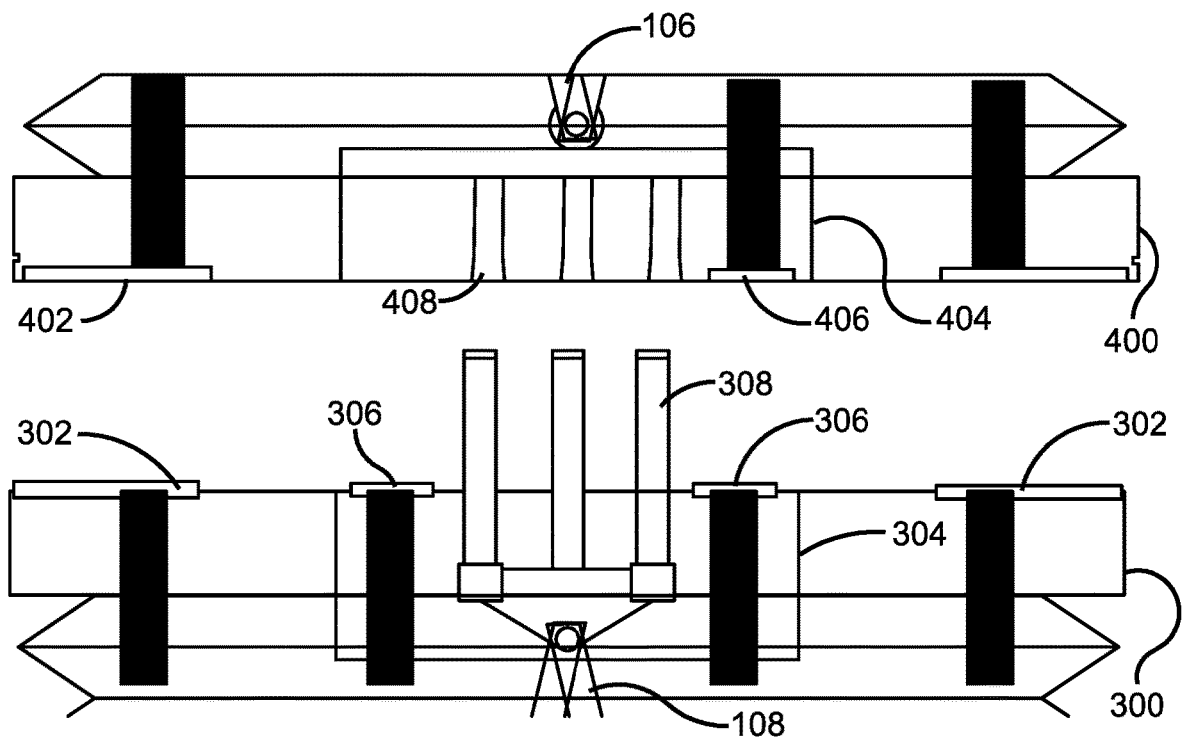
FIG. 19B is an enlarged view of FIG. 19A.

FIGS. 16 and 17 show a variation of the automated electrical connection apparatus wherein the second end of the scissor mechanism (116) is connected to a connector cover having female receptacles. FIGS. 19A and 19B illustrate a further variation of the automated electrical connection apparatus wherein a scissor mechanism of a primary connector and a scissor mechanism of a secondary connector extend a primary connector cover and a secondary connector cover towards each other so that the male pins of the (308) of the primary connector cover can engage the female receptacles (408) of the secondary connector cover. As shown within FIG. 19, the scissor mechanism of the primary connector includes a second universal joint (1900) and the scissor mechanism of the secondary connector includes a second universal joint (1902).

Figure 27:
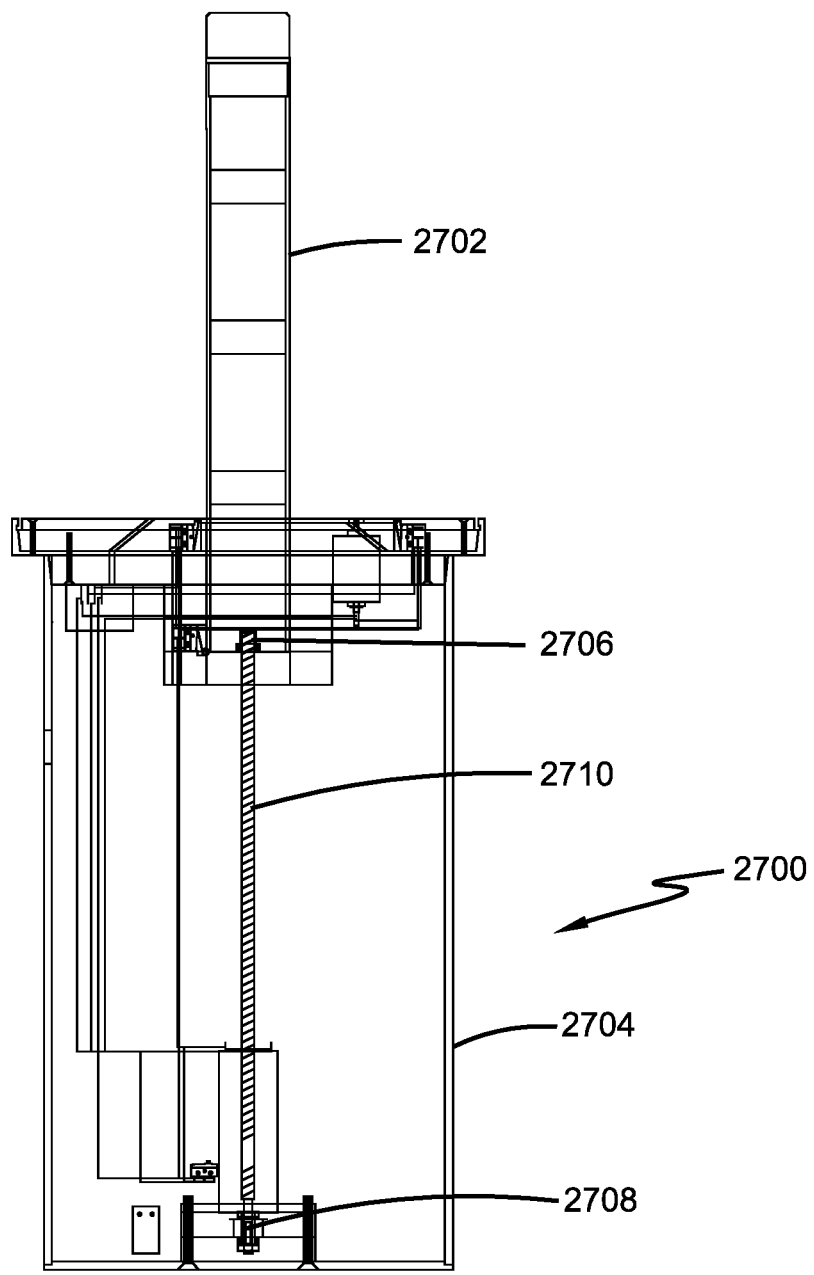
FIG. 27 is a side view of a primary connector pop-up apparatus that is installed in the ground in an extended position.
Figure 28:
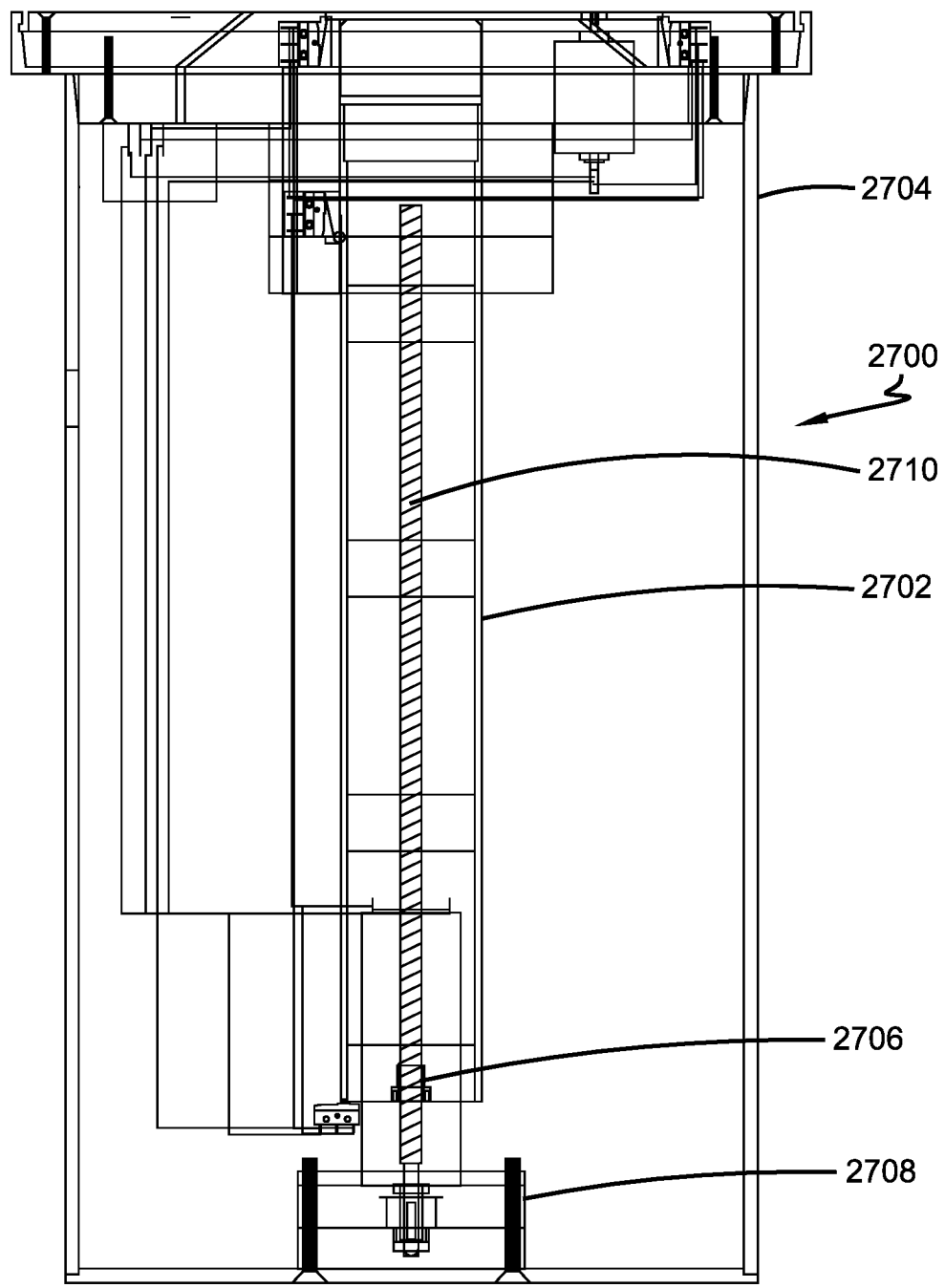
FIG. 28 is a side view of a primary connector pop-up apparatus that is installed in the ground in a retracted position.
Figure 29:
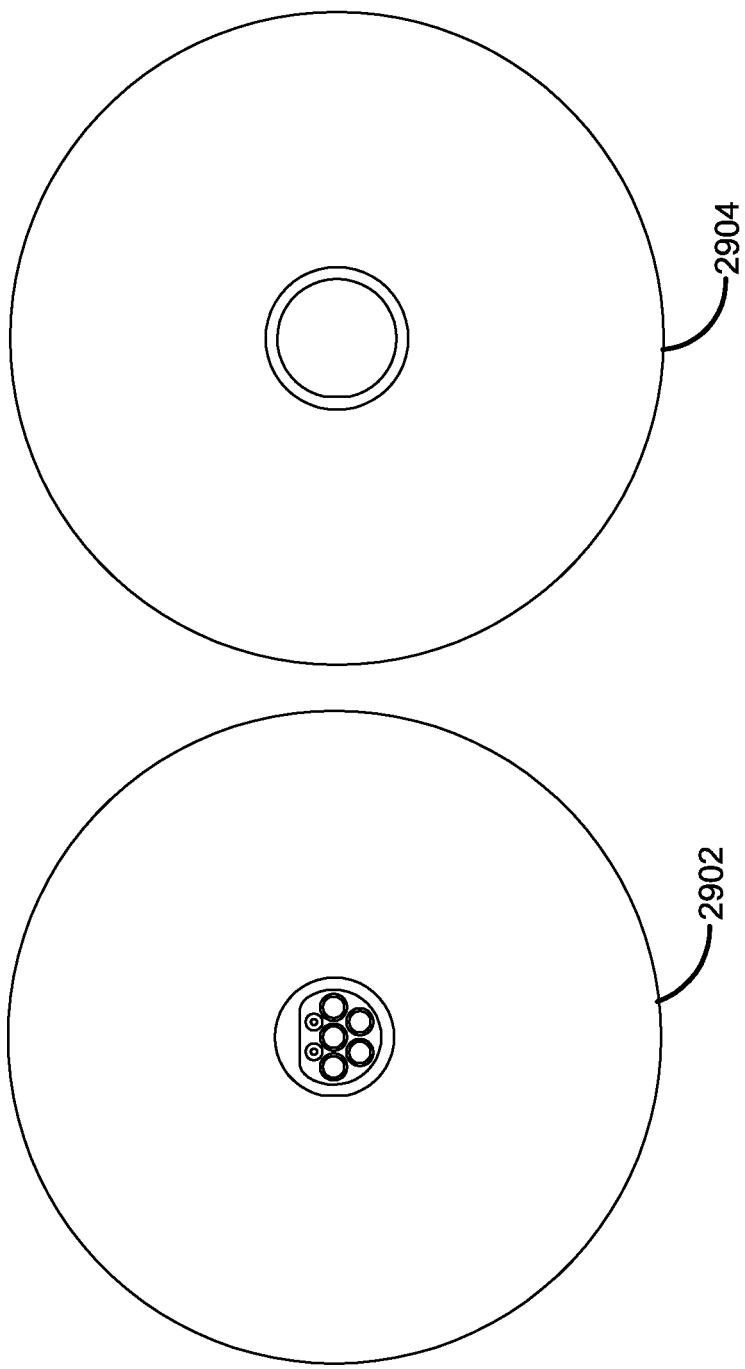
FIG. 29 is a top view of a cover door of a primary connector cover in a closed and in an open position.

As mentioned above, the adjustment or lifting mechanism that is employed within the primary connector and optionally, within the secondary connector is a scissor mechanism. However, any type of adjustment or lifting mechanism within the purview of a person of ordinary skill in the art may be used. Examples of such mechanisms include those disclosed within U.S. Pat. Nos. 9,780,584; 9,862,284 and 9,543,769 which are herein incorporated by reference in their entireties. In certain embodiments, the adjustment mechanism or lifting mechanism that is employed within the primary connector and optionally, within the secondary connector is a power assisted push up mechanism. In a power assisted push up mechanism, the cover is attached to the crown of the container and does not extend with the connector. Instead, the connector extends out from the container and out from the cover. An example of a power assisted push up mechanism (2700) that allows the primary connecter to be adjusted between the in-use or extended position out of the ground surface and the non-use retracted or stowed position within the ground surface is illustrated within FIGS. 27 and 28. As shown within FIGS. 27 and 28, the power assisted push up mechanism includes a vertically oriented shaft (2702) having a top end and a bottom end. The top end of the shaft is connected to the primary connector cover and/or optionally, a secondary connector cover in embodiments where an adjustment mechanism is employed as a component of the secondary connector. FIG. 27 illustrates vertically oriented shaft (2702) in an extended upward position out from the container (2704) housing the power assisted push up mechanism. The extended position illustrated within FIG. 27 allows the vertically oriented shaft (2702) to extend above the ground surface to reach the secondary connector cover installed on the vehicle. FIG. 28 illustrates the vertically oriented shaft (2702) positioned within the container (2704) housing the power assisted push up mechanism when in a non-use, retracted or stowed position within the ground surface. The power assisted push up mechanism includes a fastener (2706) which connects the bottom end of the shaft to a linear actuator (2708) which operates to push the vertical oriented shaft out of the container when the primary connector is in an in use or extended position. A linear actuator (2708) a hydraulic or pneumatic cylinder (2710) is attached to the bottom end of the container (2704). FIG. 29 illustrates a top view of a connector cover that may be positioned on the top end of the vertically oriented shaft (2702) of the power assisted push up mechanism (2700). As illustrated within FIG. 29, the connector cover may include a lid that allows it to alternate between an open (2902) and a closed (2904) configuration.

Figure 30:
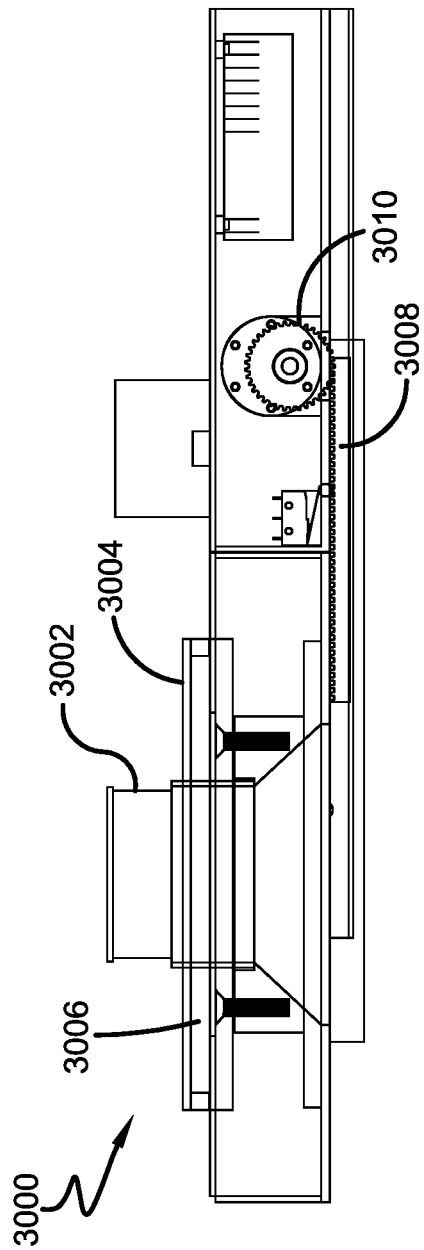
FIG. 30 is a side view of a secondary connector attached to a vehicle.
Figure 31:
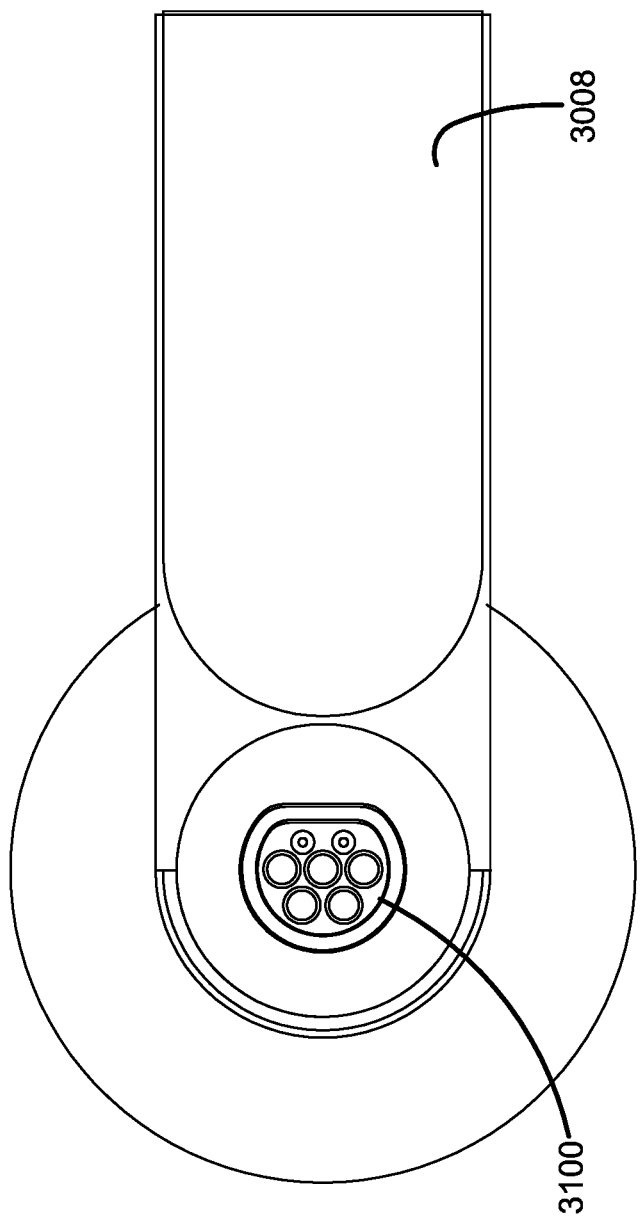
FIG. 31 is a bottom view of a cover door of a secondary connector cover in an open position.
Figure 32:
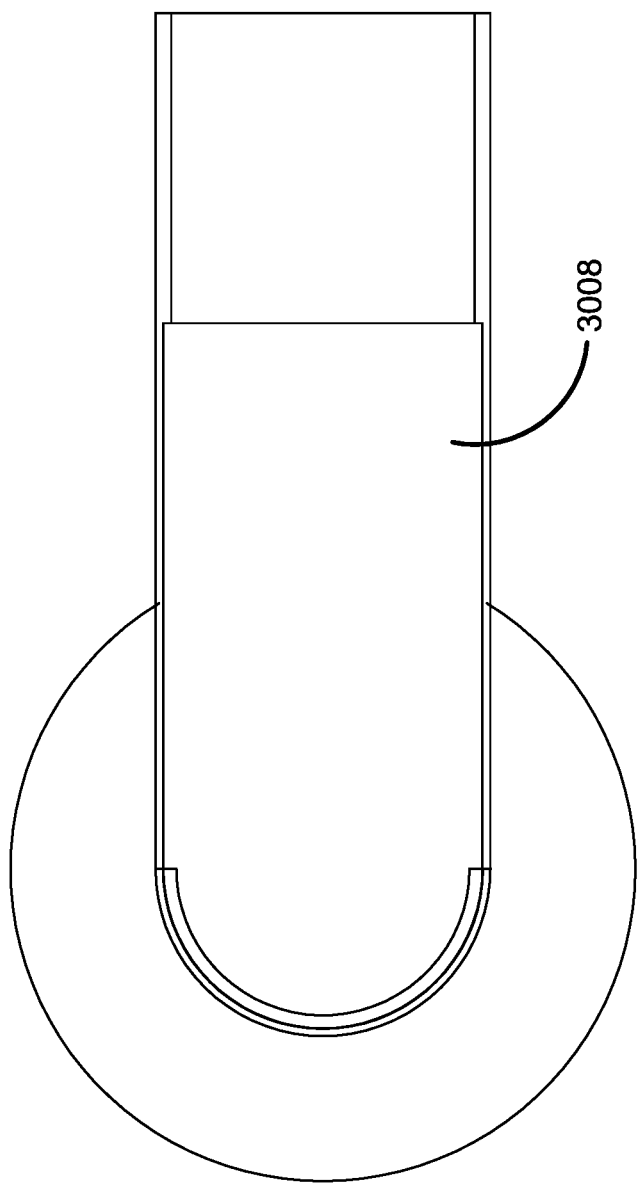
FIG. 32 is a bottom view of a cover door of a secondary connector cover in a closed position.

FIGS. 30 through 32 illustrate a secondary connector that may be employed with a primary connector having a power assisted push up mechanism (2700). As shown within FIG. 30, the secondary connector (3000) includes a container (3002) positioned within the vehicle. The container (3002) includes an open bottom end and an open top end and at least one side wall. The secondary connector does not include a secondary adjustment mechanism. The bottom end of the container (3002) of the secondary connector has a cone shape which is larger in diameter than the top end of primary connector cover allowing the primary connector to fit within the secondary connecter container and align itself with the electrical device on the secondary connector cover. The secondary connector cover housing the electrical connection device (not shown) is mounted on a floating mounting device (3004) which is suspended between the top end and the bottom end of the container by closed cell foam (3006). The closed cell foam (3006) pushes and pulls the floating device (3006) from side to side inside the container in order to achieve alignment between the pins and receptacles of the primary and secondary connectors and wherein the closed cell foam forms a watertight seal for the container. The secondary connector may also include a lid (3008) which slides over the bottom end of the container to cover the secondary connector cover containing the electrical connection device. The lid (3008) may be operated by a gear (3010) and include teeth on its top surface which engage the gear. The gear may be operated by a motor which causes the lid to be adjusted between an open and closed position. FIG. 31 shows the lid (3008) in an open position allowing access to the electrical connection device (3100) within the secondary connector container. FIG. 32 shows the lid (3008) in a closed configuration covering the electrical connection device within the secondary connection container.

In certain embodiments, the primary connector cover (300) is mounted or housed within the crown (700) and the secondary connector cover (400) is mounted or housed within the crown (800). A cover boot may also be attached to the primary connector cover and/or the secondary connector cover. When the automated electrical connection apparatus is activated, an actuator will cause the scissor mechanism (108) or power assisted push up mechanism (2700) within the primary connector (102) to push the primary connector cover (300) out of the crown (700). If the primary connector cover includes a plug in connector, the scissor mechanism (108) or power assisted push up mechanism (2700) may also cause the male pins (308) to extend out of the primary connector cover. If the secondary connector includes a scissor mechanism (116) or power assisted push up mechanism (2700), the scissor mechanism or power assisted push up mechanism (2700) will also push the secondary connector cover (400) out of the crown (800). A blast of air will then enter or fill a space between cover boot and the primary connector cover (300) and/or the secondary connector cover (400). This will cause the cover boot to elongate slightly causing contaminants or ice that may be on the cover boot to loosen and be blown off the boot of the primary (102) or the secondary cover boot (112). In further embodiments, the cover boot may include an opening within the center of the cover boot allowing air to exhaust through. As air exhausts through the center opening on the cover boot additional contaminants and ice may be blown off of the cover boot. The center opening on the cover boot may be connected to one or more conduits connected to a pneumatic device installed within the primary connector (102) or the secondary connector (112).

As the primary connector cover (300) and the secondary connector cover (400) continues to be pushed out of the crown, the electromagnets (302) and (402) installed on the primary connector cover (300) and the secondary cover move vertically in an upward and downward direction towards each other. At about this time in the process, the electromagnets (302) and (402) are activated. This causes the electromagnets (402) installed on the primary connector cover (400) to seek the corresponding electromagnets (302) installed on the connector cover (300) and vice versa. Activation of the electromagnets (302) and (402) will cause the primary connector cover (300) and the secondary connector cover (400) to move laterally, if necessary, to align the connector on a first cover with the corresponding connector on the opposing cover, thus establishing an electrical connection between the primary connector cover (300) and the vehicle secondary connector cover (400).

Figure 20:
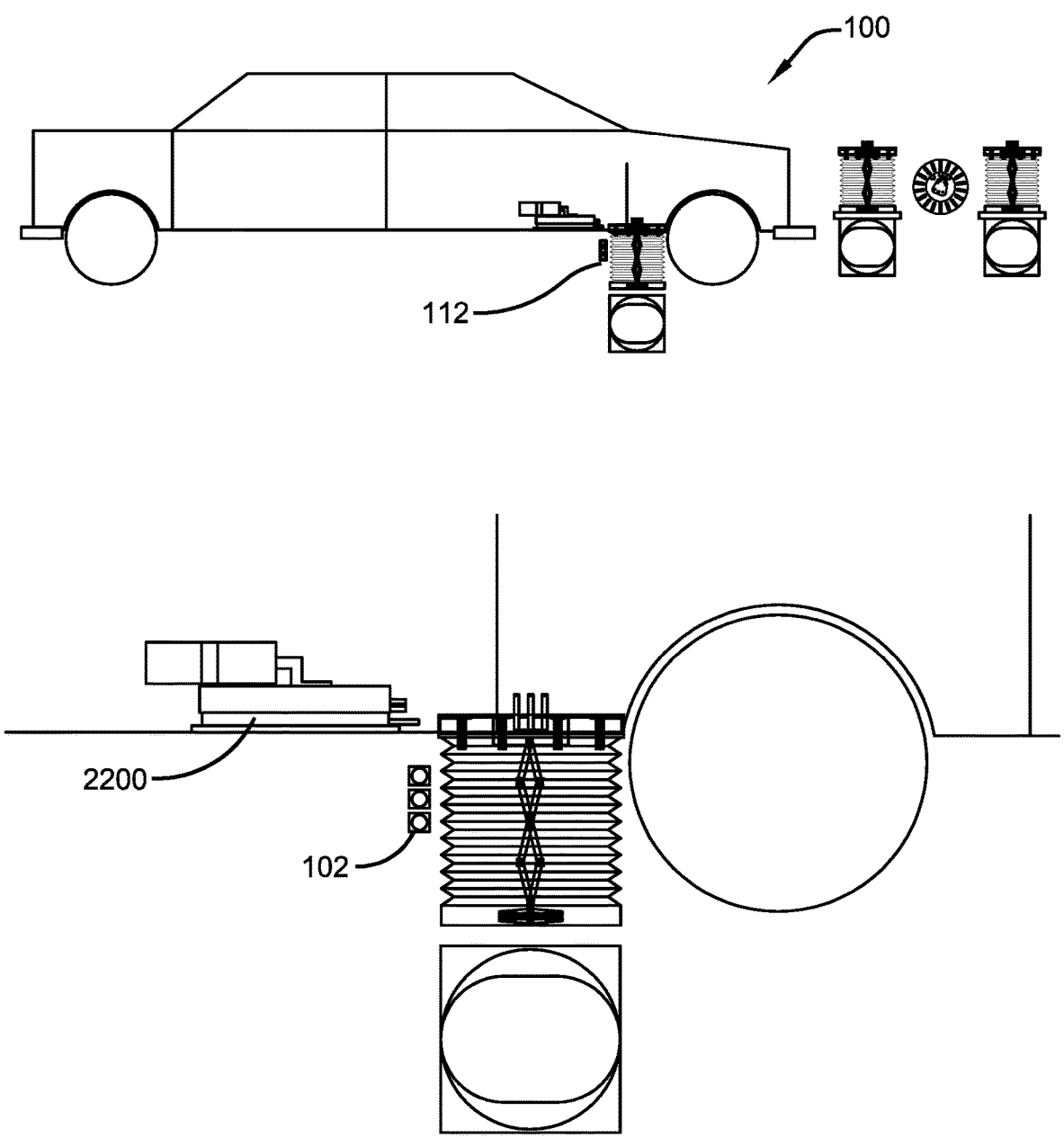
FIG. 20 is a side view of a vehicle at a charging site with the secondary connector on the vehicle deployed over the primary connector at the charging site.
Figure 21:
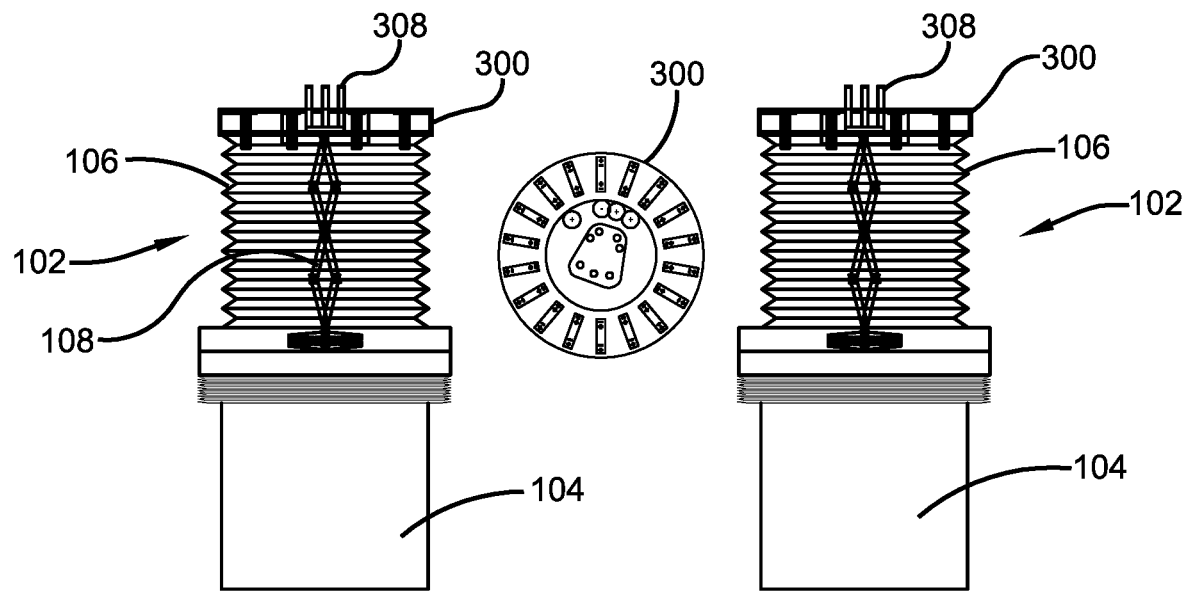
FIG. 21 is a side view of a primary connector at a charging site.
Figure 22:
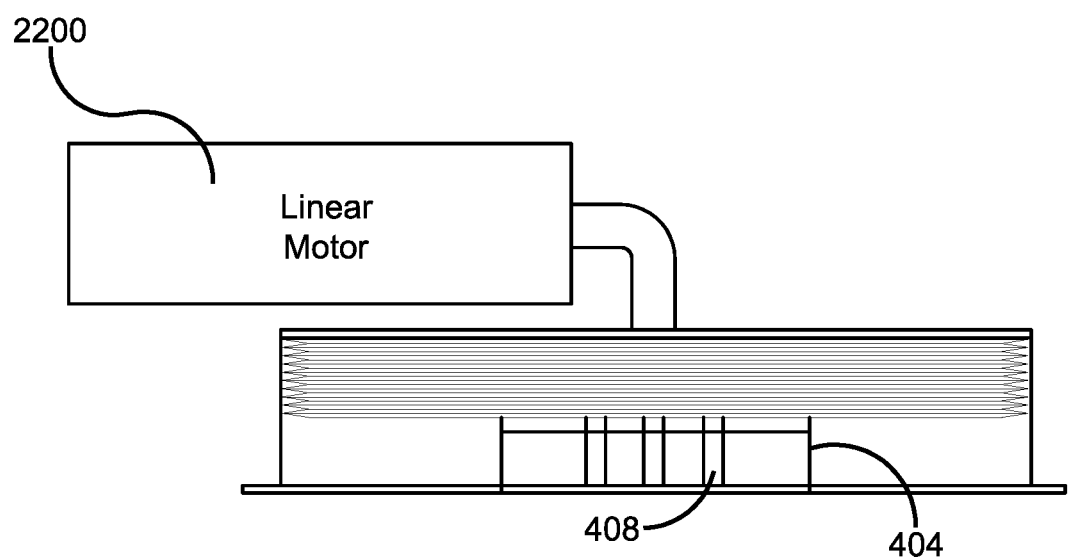
FIG. 22 is a side view of a secondary connector on a vehicle connected to a linear motor.
Figure 23:
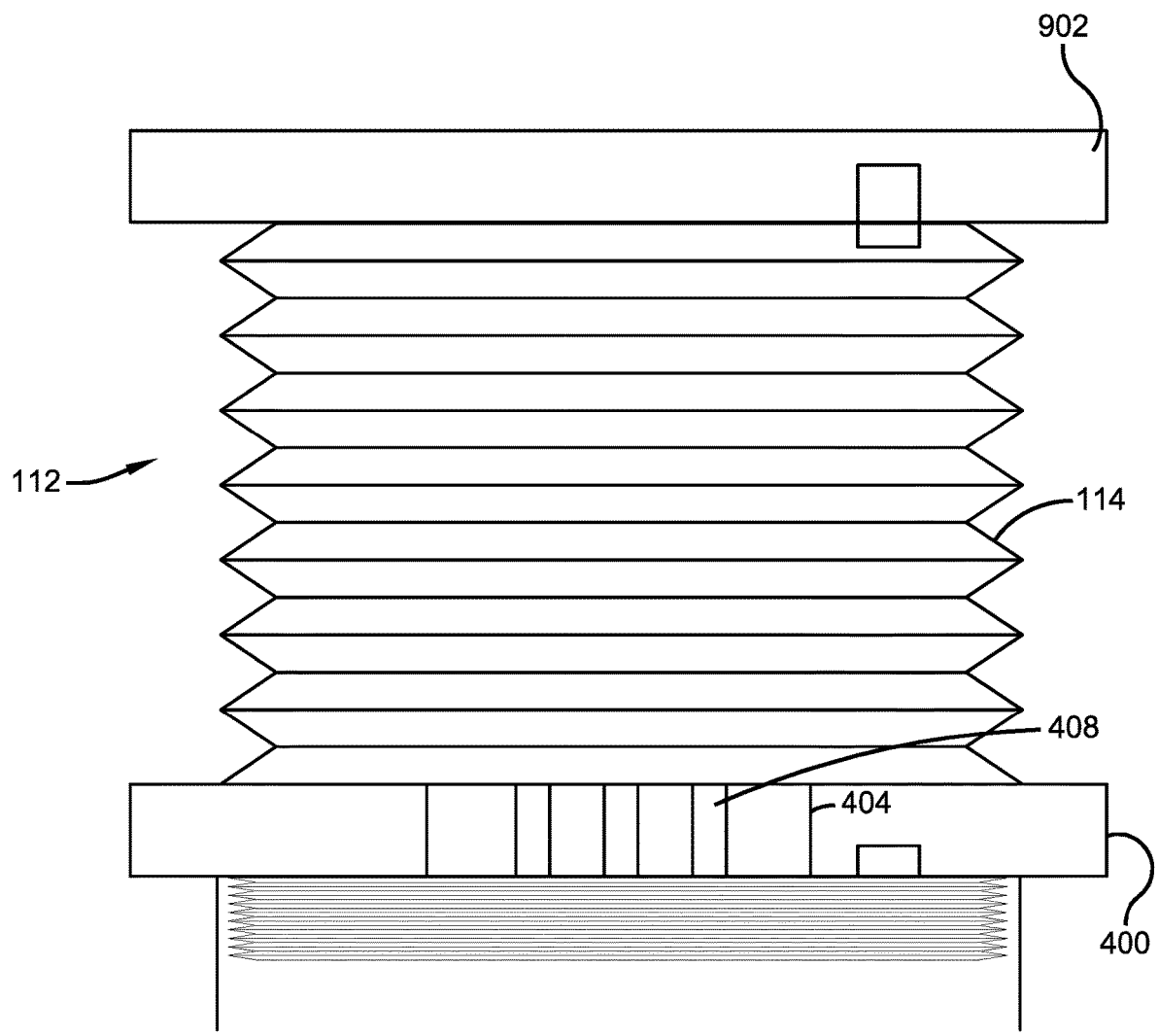
FIG. 23 is a side view of a secondary connector on a vehicle.
Figure 24:
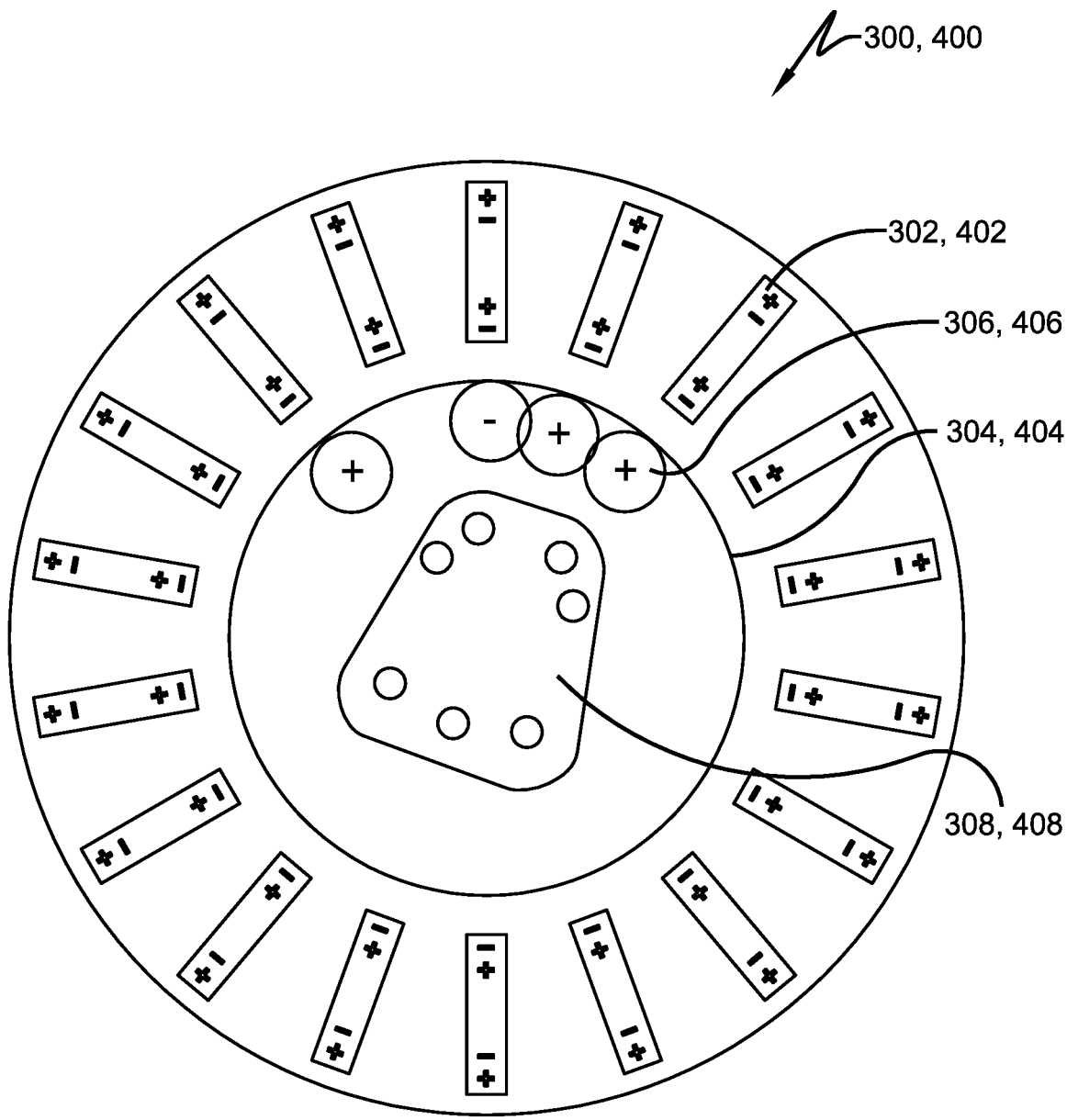
FIG. 24 is a top view of a connector cover for a primary or secondary connector.
Figure 25:
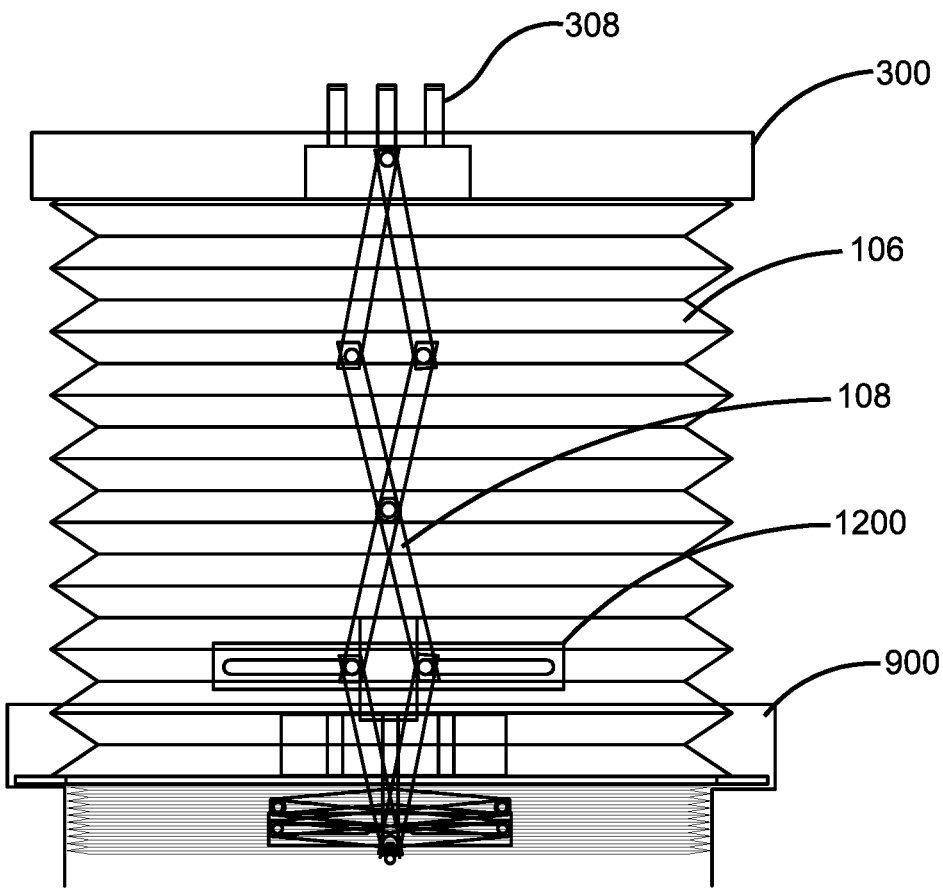
FIG. 25 is a cross-sectional side view of a primary connector at a charging site.
Figure 26:
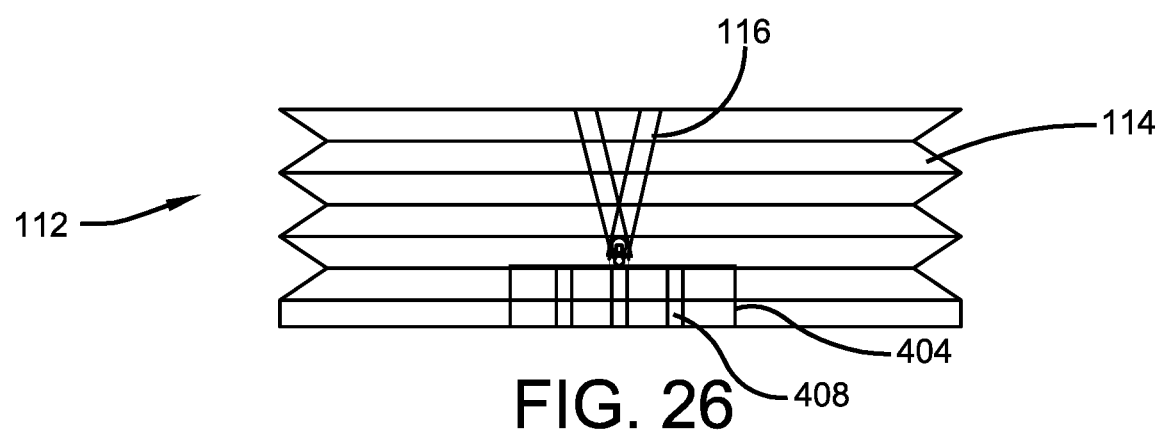
FIG. 26 is a cross-sectional side view of a portion of a secondary connector on a vehicle.

In operation, a vehicle is driven up to a charging station to recharge the battery of the vehicle as shown in FIG. 20. Once the vehicle is parked at the charging site, contact between the primary connector (102) at the charging site and the vehicle secondary connector (112) of the vehicle is initiated causing the scissor mechanism or power assisted push up mechanism within the primary connector (102) to raise or lift the primary connector cover (300) upwards toward the bottom end of the vehicle. Optionally, a scissor mechanism (116) or power assisted push up mechanism may be employed within the vehicle secondary connector (112) to lower the vehicle secondary connector cover (400) downwards towards the top of the primary connector cover (300) until the primary connector cover (300) connects with the vehicle secondary connector cover (400). FIGS. 21 and 25 illustrate the primary connector in a fully extended state or configuration.

In further embodiments, operation of the pop-up apparatus may be controlled through a network service such as those offered by ChargePoint (Campbell, Calif.), Uber (San Francisco, Calif.) or some other type of fleet service. In such embodiments, a driver may enter a command in a software app on a mobile device initiate the charging process. The mobile device will then send a signal to the vehicle instructing the vehicle to start up and drive itself to the nearest charging site. The entire charging process is controlled by the app on the driver's mobile device without the driver having to be present with the vehicle. Once the charging of the vehicle at the charging site is complete, the vehicle will drive itself back to the driver's location.

In certain embodiments, activation of the pop-up apparatus of the primary connector (102) and the optional pop-up apparatus of the secondary connector (112) is accomplished through activation of an associated actuator. Activation of the actuator may be initiated wirelessly by the driver through an onboard computer on the vehicle or by a command via an app on a mobile device such as a cell phone, tablet, laptop or other computing device. Alternatively, the primary connector (102) pop-up apparatus and the optional secondary connector (112) pop-up apparatus may be activated for deployment to charge the vehicle by the driver pushing a button on a control panel within the vehicle.

It should be understood that in certain embodiments, there is no electrical power flow in the primary connector until the primary connector is engaged with the secondary connector. Once the vehicle secondary connector cover (400) and the primary connector cover (300) are connected or joined together, further communication for charging the battery of an electric vehicle is made through the connection established by the vehicle computer system. At this time, control of the vehicle is out of the hands of the driver except to terminate the charging cycle if desired. Termination of the charging cycle may be controlled by the driver or by an operator at the charging station. Termination of the charging cycle may also be initiated automatically when the battery within the vehicle achieve full charge. Once the charging cycle is terminated, power to the primary and secondary connector is discontinued or terminated. The computer within the vehicle will then begin the process of disconnecting the electrical connection between primary connector cover (300) and the vehicle secondary apparatus cover (400). The charging site primary connector (102) and the vehicle secondary connector (112) takes control and retracts the corresponding charging unit covers (300 and 400) to a flush position with the corresponding surface within the ground or on the vehicle (in embodiments where the secondary connector employs a pop-up apparatus). Once the primary connector (102) and the secondary connector (112) are secured in their non-use state, the electric charging unit will communicate wirelessly with the computer in the onboard computer within the vehicle and control of the vehicle will be returned to the driver. The driver may then drive away from the charging site safely.

The charging site primary pop-up apparatus and vehicle secondary pop-up apparatus are manufactured from common materials that are sufficiently strong and easy to manufacture including but not limited to metal, carbon fiber, fiberglass, plastic and rubber. The bellows are manufactured from rubber, rubber and cloth composites, plastics, metal and other materials commonly used in the manufacture of bellows. The primary connector cover and the secondary connector cover are manufactured from materials sufficiently strong enough to support heavy loads.

While the automated electrical connection apparatus has been described above in connection with various illustrative embodiments, it is to be understood that other similar embodiments may be used or modifications and additions may be made to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the automated electrical connection apparatus should not be limited to any single embodiment, but rather construed in breadth and scope in accordance with the recitations of the appended claims.

What is claimed is:

1. An automated electrical connection apparatus for charging a battery on an electric vehicle comprising:
    a primary connector at a charging site comprising:
        a pop-up apparatus positioned under a ground surface that is capable of being adjusted between an in use or extended position out of the ground surface and a non-use, retracted or stowed position beneath the ground surface, wherein the pop-up apparatus comprises a container positioned under the ground surface, wherein the container includes a bottom end, an open top and at least one side wall comprising an inside wall and an outside wall,
        wherein the pop-up apparatus further comprises a primary adjustment mechanism having a top end and a bottom end positioned within the container and a primary connector cover housing an electrical connection device connected to the top end of the primary adjustment mechanism, wherein the primary connector cover is flush with the ground surface when the primary adjustment mechanism is in the retracted or stowed position
        wherein the open top of the container includes a crown which provides a surface for the primary connector cover to rest on and a seal bed to prevent water and contaminants from entering the container;
    a secondary connector on an electric vehicle comprising:
        a secondary connector cover housing an electrical connection device and optionally, a secondary adjustment mechanism connected to the secondary connector cover which is positioned within the vehicle and is capable of being adjusted between an in use or extended position out from the vehicle and a non-use, retracted or stowed position within the vehicle,
    wherein an electrical connection is established between the primary connector cover and the secondary connector cover when the pop-up apparatus is adjusted to its extended position,
    wherein the electrical connection apparatus comprises at least one of the following:
        1.) wherein the electrical connection device on the primary connector cover comprises one or more primary induction coils connected to a power source and the electrical connection device on the secondary connector cover comprises one or more secondary induction coils, wherein the secondary induction coil is connected to a vehicle's circuitry to charge the battery on the vehicle, wherein an electrical connection between the primary connector cover and the secondary connector cover is established without the primary connector cover being in physical contact with the secondary connector cover;
        2.) wherein the electrical connection device on the primary connector cover comprises a primary plug in connector connected to a power source and the electrical connection device on the secondary cover comprises a secondary plug in connector, wherein the secondary plug in connector is connected to a vehicle's circuitry to charge the battery on the vehicle, wherein the primary plug in connector engages a secondary plug in connector when the pop-up apparatus of the primary connector is in the extended position;
        3.) wherein the electrical connection device on the primary connector cover comprises a primary side of an electrical transformer and the electrical connection device on the secondary connector cover comprise a secondary side of the electrical transformer, wherein the primary side of the electrical transformer is connected to a power source, wherein the secondary side of the electrical transformer is connected to a vehicle's circuitry to charge the battery on the vehicle, wherein the primary side of the transformer and the secondary side of the transformer form a single transformer unit when the primary connector cover is in its extended position and connected to the secondary connector cover.

2. The automated electrical connection apparatus of claim 1, wherein the pop-up apparatus further comprises bellows positioned between the container crown and the primary connector cover, wherein the bellows comprises at least one side wall, a top open and a bottom open end, wherein the bellows houses the primary adjustment mechanism and wherein the bellows maintains a watertight fit over the pop-up apparatus when the primary connector is in the extended position.

3. The automated electrical connection apparatus of claim 2, wherein the bottom end of the bellows comprises a movable bellows flange that fits against the inside wall of the crown forming a moveable watertight seal and wherein the top end of the bellows comprises an internal ring for attaching the bellows to the primary connector cover.

4. The automated electrical connection apparatus of claim 3, wherein the primary connector cover rests within the crown of the container when the primary connector cover or pop-up apparatus is in the retracted or stowed position, wherein a cover boot is attached to the primary connector cover, wherein the cover boot comprises a first aperture allowing compressed air to enter within an interior space formed within the cover boot and a second aperture allowing compressed air to exit from the interior space formed within the cover boot, wherein upon activation of a charging event, a blast of compressed air enters between the primary connector cover and the cover boot causing the cover boot to elongate and expand to loosen any debris and ice formed on its surface, wherein as air exits from the cover boot, loosed debris and ice are blown off from the cover boot and an actuator causes the primary adjustment mechanism to push the primary connector cover out of the crown.

5. The automated electrical connection apparatus of claim 4, wherein the primary connector cover comprises electromagnets and the secondary connector cover comprises electromagnets, wherein upon activation of a charging cycle, the electromagnets on the primary connector cover and the secondary connector cover are activated to attract the primary connector cover and the secondary connector cover towards each other, wherein the primary connector cover is pulled perpendicular to its extension by the primary adjustment mechanism allowing for alignment between the primary connector cover and the secondary connector cover.

6. The automated electrical connection apparatus of claim 5, wherein the primary connector cover comprises a nonconductive housing, clocking permanent magnets and male pins or female receptacles and/or a primary transformer side, wherein the secondary plug in connector comprises a nonconductive housing, clocking permanent magnets and male pins or female receptacles and/or a secondary transformer side.

7. The automated electrical connection apparatus of claim 6, wherein the primary plug in connector comprises male pins and the secondary plug in connector comprises female receptacles for engagement with the male pins of the primary plug in connector, wherein at least one of the primary plug in connector nonconductive housing and the secondary plug in connector nonconductive housing comprises a nonconductive disk housing the clocking permanent magnets and the male pins or female receptacles, wherein the clocking permanent magnets are mounted in such a manner that as the primary connector cover and the secondary connector cover approach each other, the clocking permanent magnets natural attractive and repulsive forces cause the nonconductive disk on at least one opposing connector cover to rotate to align the male pins with the female receptacles.

8. The automated electrical connection apparatus of claim 6, wherein the primary connector cover includes a primary transformer side and the secondary connector cover includes a second transformer side, wherein at least one of the primary connector cover nonconductive housing and the secondary connector cover nonconductive housing comprises a nonconductive disk housing the clocking permanent magnets and the primary transformer side and the secondary transformer side, wherein the clocking permanent magnets are mounted in such a manner that as the primary connector cover and the secondary connector cover approach each other, the clocking permanent magnets natural attractive and repulsive forces cause the nonconductive disk on at least one opposing connector cover to rotate to align the primary transformer side with the secondary transformer side.

9. The automated electrical connection apparatus of claim 8, wherein the primary transformer side slides in the primary connector cover rendering it flush with the surface of the primary connector cover when the primary connector is in a non-use, retracted or stowed position and wherein the primary transformer side slides out of the primary connector cover and into the secondary transformer side to form a single air gap transformer when the primary connector is in an in-use or extended position.

10. The automated electrical connection apparatus of claim 1, wherein the primary adjustment mechanism of the primary connector comprises a scissor mechanism having a first end and a second end which allows the primary connector to be adjusted between the in-use or extended position out of the ground surface and the non-use retracted or stowed position within the ground surface, wherein a scissor support bracket is positioned near the open top of the container for supporting the scissor mechanism within the bellows and wherein the scissor mechanism comprises a first universal joint which connects the first end of the scissor mechanism to the bottom end of the container and a second universal which connects the second end of the scissor mechanism to the primary connector cover.

11. The automated electrical connection apparatus of claim 1, wherein the primary adjustment mechanism comprises a power assisted push up mechanism that allows the primary connecter to be adjusted between the in-use or extended position out of the ground surface and the non-use retracted or stowed position within the ground surface.

12. The automated electrical connection apparatus of claim 11, wherein the power assisted push up mechanism comprises a vertically oriented shaft having a top end and a bottom end, wherein the vertically oriented shaft is positioned within the container when in a non-use, retracted or stowed position within the ground surface and wherein the vertically oriented shaft extends the primary connector out of the container when in an in-use or extended position above the ground surface to reach the secondary connector cover installed on the vehicle.

13. The automated electrical connection apparatus of claim 12, wherein a fastener connects the bottom end of the shaft to an actuator or to a pneumatic or hydraulic cylinder which operates to push the vertical oriented shaft out of the container when the primary connector is in an in use or extended position.

14. The automated electrical connection apparatus of claim 13, wherein the linear actuator or pneumatic or hydraulic cylinder is attached to the bottom end of the container and wherein the actuator is a linear actuator.

15. The automated electrical connection apparatus of claim 1, wherein the secondary connector comprises a container positioned within the vehicle, wherein the container includes an open bottom end and an open top end and at least one side wall, wherein the secondary connector does not include a secondary adjustment mechanism, and wherein the secondary connector cover housing the electrical connection device is mounted on a floating mounting device which is suspended between the top end and the bottom end of the container by closed cell foam.

16. The automated electrical connection apparatus of claim 15, wherein the closed cell foam pushes and pulls the floating device from side to side inside the container in order to achieve alignment between the pins and receptacles of the primary and secondary connectors and wherein the closed cell foam forms a watertight seal for the container.

17. The automated electrical connection apparatus of claim 16, wherein the bottom end of the container of the secondary connector has a cone shape which is larger in diameter than the primary connector cover allowing the primary connector cover to fit within the secondary connecter container and align itself with the electrical device on the secondary connector cover.

18. The charging system of claim 1, wherein activation of the primary connector adjustment mechanism and optionally, the secondary connector adjustment mechanism is initiated wirelessly and automatically through an onboard computer on the vehicle, through a command entered on a software application on a mobile computer device or by the driver pushing a button on a control panel within the vehicle or through an independent charging sit management system.

19. A method of charging an electric vehicle utilizing the charging system of claim 6 comprising:
  driving a vehicle up to a charging station to renew a charge of a vehicle's battery;
  initiating contact between the secondary connector on the vehicle and the primary connector at the charging site, wherein contact is initiated wirelessly and automatically through an onboard computer on the vehicle, by a command on a software application on a mobile computing device or by the driver pushing a button on a control panel within the vehicle to send a wireless communication to a computing device within the primary connector or charging site to initiate the charging process
    wherein upon acceptance of the charging process, the primary connector begins the process of deployment, wherein the deployment process comprises:
    blowing a blast of air into a cavity between the primary connector cover and the primary connector cover boot, loosening ice and debris and allowing the air to exit through an aperture in the center of the cover boot blowing the ice and debris away,
    activating the adjustment mechanism of the primary connector to cause the primary connector cover to extend upward from the ground surface toward the secondary connector cover on the vehicle,
    initiating an actuator within the primary connector to cause the adjustment mechanism within the primary connector to push the primary connector cover out of the crown of the primary connector container
    activating the electromagnets on the primary connector cover and the secondary connector cover to cause the primary connector cover to move towards the secondary connector cover
    allowing permanent clocking magnets positioned on a nonconductive disk within a nonconductive housing on the primary connector and permanent clocking magnets positioned on a nonconductive housing on the secondary connector to allow the primary nonconductive disk and the secondary nonconductive disk to rotate with respect to each other in order to align the connection between the primary connector cover and the secondary connector cover;
  engaging the primary connector to the secondary connector to form an electrical connection, wherein electrical power is unavailable to the primary connector until the primary connector is engaged with the secondary connector;
  allowing electricity to flow through the electrical connection to charge the vehicle's battery;
  terminating contact between the secondary connector and the primary connector, wherein contact is automatically terminated wirelessly through an onboard computer on the vehicle upon the battery achieving full charge, by a command entered on a software application on a mobile computing device or by the driver pushing a button on a control panel within the vehicle to send a wireless communication to a computing device within the primary connector or charging site terminate the charging process,
  wherein upon acceptance of the termination process, the primary connector begins the process of retraction, wherein the retraction process comprises:
  deactivating the electromagnets on the primary connector cover and the secondary connector cover to allow the primary connector cover and the secondary connector cover to disengage;
  discontinuing power to the primary connector prior to disconnection of the primary and secondary connectors;
  activating the adjustment mechanism on the primary connector to cause the primary connector cover to disengage from the secondary connector cover and retract downward towards the ground surface and away from the secondary connector cover on the vehicle until the primary connector is in a fully retracted position within the container and the primary connector cover is flush with the ground.

* * * * *